United States Patent
Otani et al.

(10) Patent No.: US 6,865,720 B1
(45) Date of Patent: Mar. 8, 2005

(54) APPARATUS AND METHOD FOR DIVIDING DOCUMENT INCLUDING TABLE

(75) Inventors: Noriko Otani, Ageo (JP); Yuji Ikeda, Kawasaki (JP); Takaya Ueda, Yokohama (JP); Kenichi Fujii, Yokohama (JP); Fumiaki Itoh, Yokohama (JP); Toshiaki Ueguri, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/533,255

(22) Filed: Mar. 23, 2000

(30) Foreign Application Priority Data

Mar. 23, 1999 (JP) ............................................ 11-077583
Mar. 23, 2000 (JP) ....................................... 2000-081870

(51) Int. Cl.[7] .......................... G06F 17/24; G06F 17/27
(52) U.S. Cl. ...................... 715/904; 715/503; 715/509; 715/513; 715/523; 715/903; 345/747; 345/776; 345/809
(58) Field of Search .............................. 715/503, 509, 715/903, 513, 523, 904; 345/809, 747, 776

(56) References Cited

U.S. PATENT DOCUMENTS 5,708,730 A * 1/1998 Itonori ........................ 382/177
5,950,196 A * 9/1999 Pyreddy et al. ................ 707/5
6,006,240 A * 12/1999 Handley ...................... 715/510
6,173,073 B1 * 1/2001 Wang .......................... 382/176
6,442,575 B2 * 8/2002 Pratley et al. ............... 715/503
6,496,832 B2 * 12/2002 Chi et al. .................... 707/102
6,535,896 B2 * 3/2003 Britton et al. .............. 715/523
2002/0054126 A1 * 5/2002 Gamon ........................ 345/781
2002/0091728 A1 * 7/2002 Kjaer et al. ................. 707/503
2002/0124016 A1 * 9/2002 Rank et al. .................. 707/503
2003/0071848 A1 * 4/2003 Carroll ........................ 345/776

OTHER PUBLICATIONS

Ricky Winter & Patty Winter, Microsoft Office 97 User Manual, 1998, Que Corporation, pp. 922–923.*
Ricky Winter & Patty Winter, Microsoft Office 97 User Manual, 1998, Que Corporation.*

* cited by examiner

*Primary Examiner*—Stephen S. Hong
(74) *Attorney, Agent, or Firm*—Fitzpatrick, Cella, Harper & Scinto

(57) ABSTRACT

A table in an HTML document is analyzed to generate cell position data indicating a positional relationship between cells and cell vectors representing characteristics of the cells, and a table type is judged with reference to the cell position data and the cell vectors, and, if the table type is a table describing a table, it is judged whether the data is represented in a column or a row with reference to the cell position data and the cell vectors, and a cut direction of the table is determined, and segments are generated with reference to the table type and the cut direction. If the table type is a table for layout, the cells are clustered with reference to the cell vectors, and the segments are generated with reference to the cell position data and cell cluster information.

45 Claims, 36 Drawing Sheets

FIG. 8

How To Rear Flowers

| Flower Name | How to Rear | Time for Sowing |
|---|---|---|
| Violet | | |
| Morning Glory | | |
| Balsam | | |
| ⋮ | | |

FIG. 12

A Page Of Products Catalog

| Type No. | Sales Unit | Delivery Time |
|---|---|---|
| AAA0001 | | |
| AAA0002 | | |
| AAA1001 | | |
| ⋮ | | |

FIG. 15

A Page Of Medical Centers

| Name | Business Hours | Holiday |
|---|---|---|
| A Clinic | | |
| B Clinic | | |
| C Clinic | | |
| ⋮ | | |

| Name | Address | Phone Number |
|---|---|---|
| Taro Yamada | Yokohama-City | 045-000-0000 |
| Hanako Yamada | Kawasaki-City | 044-111-1111 |

FIG. 28

How To Rear Flowers

| Supplementary Data A | | |
|---|---|---|
| Flower Name | How to Rear | Time for Sowing |
| Violet | | |
| Morning Glory | | |
| Balsam | | |
| Supplementary Data B | | |

APPARATUS AND METHOD FOR DIVIDING DOCUMENT INCLUDING TABLE

BACKGROUND OF THE INVENTION

1. Field of the Invention

The present invention relates to document segmentation apparatus and methods for dividing a document from content to content, and more particularly it relates to document segmentation apparatus and methods for dividing a document including a table or tables.

2. Related Background Art

In the past, information on the web has been presented in units termed "pages", and the arrangement and dimension of the page can freely be set by the information presenter. Of course, the information presenter forms the pages on the basis of his or her information transmitting intention, but it is not necessarily the case that such pages meet the requirements of a reader.

Accordingly, even when a series of topics or subjects which are judged to have close relation by the presenter are gathered in one page, the reader may not want such relation, and, if only one of plural subjects is useful, information about the other subjects may be an obstacle when required information is retrieved. Particularly, in mobile equipment having an information presenting space, a function for displaying only required information is important.

Thus, it is important that documents to be displayed are divided into segments based on content (segmentation) in advance and that only a portion which is requested by the reader is presented. In almost all web pages, contents are written by using Hyper Text Markup Language (HTML), which is a language for use in composing web pages. Although HTML is a language for describing the structure of the document, it is difficult to describe details of theoretical structure by using HTML, and the main role of HTML is to designate the layout in the browser.

However, it is considered that the viewpoint of the information presenter is reflected in the layout of the page. Thus, there has been proposed a technique in which the page is divided on the basis of HTML tags in order to generate segments which reflect the intention of the information presenter.

In such a technique, a table, in the sense of a portion between the <TABLE>tag and the </TABLE>tag, is judged as one meaningful group and is formed as one segment. However, such a table frequently includes a plurality of sets of information which occupy a relatively great space.

Further, such "tables" can be categorized into tables in the general meaning of that word, and table formatting used for designating the layout of image or text. In the two cases, tags are used in quite different ways.

Furthermore, when the table formatting describes an actual table, a set of data is represented in a column or in a row, or there is a column (or row) with a given item name or not; that is, the table has various styles.

SUMMARY OF THE INVENTION

An object of the present invention is to divide a table into a plurality of segments on the basis of contents thereof.

Another object of the present invention is to provide a table in a document divided into segments differing from each other in content, by analyzing the table to be processed to judge whether the table is an actual table or table formatting being used as a tool of layout, and by generating segments accordingly.

A further object of the present invention is to provide an actual table into data segments on the basis of the style of the actual table.

A still further object of the present invention is to generate segments on the basis of groups of contents when table formatting is used to obtain a desired layout of image or text.

According to one aspect, the present invention which achieves these objectives relates to a document segmentation apparatus comprising table analyzing means for generating cell position data indicating a positional relationship between cells and cell vectors representing characteristics of the cells, by analyzing a table in a document to be processed, table type judging means for judging a table type with reference to the cell position data and the cell vectors generated by the table analyzing means, first segment generating means for generating a segment from the table when the table type is a table describing a table, and second segment generating means for generating a segment from the table when the table type is a table for layout.

According to another aspect, the present invention which achieves these objectives relates to a document segmentation method comprising a table analyzing step for generating cell position data indicating a positional relationship between cells and cell vectors representing characteristics of the cells, by analyzing a table in a document to be processed, a table type judging step for judging a table type with reference to the cell position data and the cell vectors generated by the table analyzing step, a first segment generating step for generating a segment from the table when the table type is a table describing a table, and a second segment generating step for generating a segment from the table when the table type is a table for layout.

According to still another aspect, the present invention which achieves these objectives relates to a computer-readable storage medium storing a document segmentation program for controlling a computer to perform document segmentation, the program comprising codes for causing the computer to perform a table analyzing step for generating cell position data indicating a positional relationship between cells and cell vectors representing characteristics of the cells, by analyzing a table in a document to be processed, a table type judging step for judging a table type with reference to the cell position data and the cell vectors generated by the table analyzing step, a first segment generating step for generating a segment from the table when the table type is a table describing a table, and a second segment generating step for generating a segment from the table when the table type is a table for layout.

Other objectives and advantages besides those discussed above will be apparent to those skilled in the art from the description of the preferred embodiments of the intention which follows. In the description, reference is made to accompanying drawings, which form a part thereof, and which illustrate examples of the invention. Such examples, however, are not exhaustive of the various embodiments of the inventions, and therefore reference is made to claims which follow the description for determining the scope of the invention.

BRIEF DESCRIPTION OF THE DRAWINGS

FIG. 8 is a view showing an example of a table in an HTML document;

FIG. 12 is a view showing an example of a table in an HTML document;

FIG. 15 is a view showing an example of a table in an HTML document;

FIG. 28 is a view showing an example of a table in an HTML document;

FIGS. 32A, 32B and 32C are views showing an example of a composite table;

DESCRIPTION OF THE REFERRED EMBODIMENTS

The present invention will now be explained in connection with the preferred embodiments thereof with reference to the accompanying drawings.

[First Embodiment]

Figure 1:
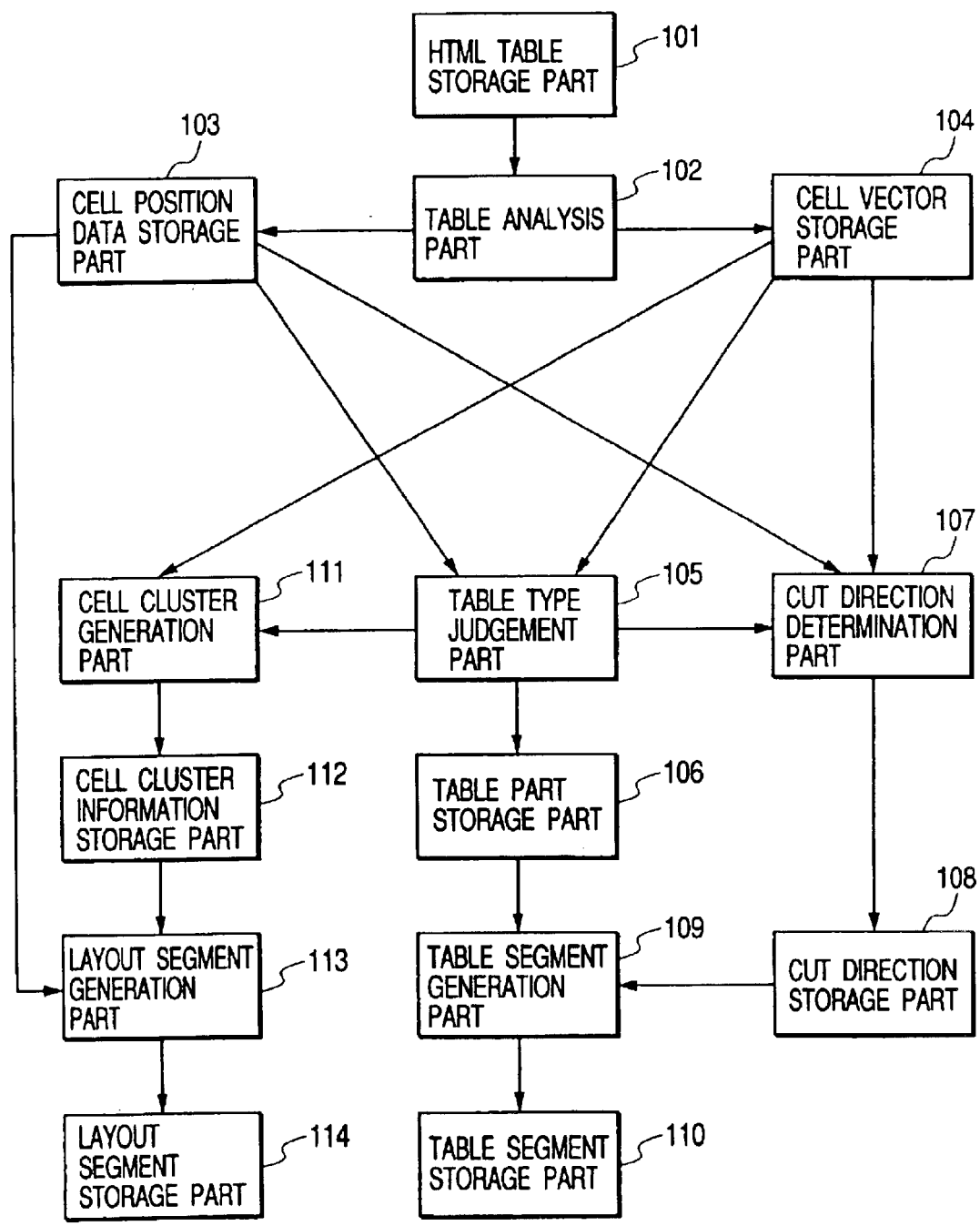
FIG. 1 is a block diagram showing a functional construction of a document segmentation apparatus according to a first embodiment of the present invention.

FIG. 1 is a block diagram showing a functional construction of a document segmentation apparatus according to a first embodiment of the present invention. In FIG. 1, an HTML table storage part 101 serves to hold or store a table (a portion between the tags <table>and </table>) in the HTML document to be processed.

A table analysis part 102 serves to analyze the table stored in the HTML table storage part 101 and to generate cell position data representing a positional relationship between cells and cell vectors representing characteristics of the cells.

The cell vector is determined by height and width of the cell, a displaying position of contents, a background color, length and character type of a text in the cell, and magnitude and shape of an image in the cell. The dimension of the cell is (the number of images in the cell×4+17), and each component is a real number greater than 0 and smaller than 1. When it is assumed that the image which firstly appears in the cell is image$_1$, the k-th component v(k) of the cell vector v is defined as follows:

v(0): when the tag is <TH>(cell representing item name), 1,0, and when <TD>(cell representing data), 0.0 v(1): when rowspan (row width) is below 4, rowspan×0.25, and when the rowspan is above 4, 1.0 v(2): when colspan (column width) is below 4, colspan×0.25, and when the colspan is above 4, 1.0 v(3): when nowrap (no line space) is designated, 1.0, and when not designated, 0.0 v(4): when align (lateral position) is not designated, 0.0, and when left (left end), 0.2, and when center (central position), 0.4, and when right (right end), 0.6, and when justify (uniform), 0.8, and when others, 1.0 v(5): when valign (vertical position) is not designated, 0.0, and when top (upper end), 0.2, and when middle (center), 0.4, when bottom (lower end), 0.6, and when baseline, 0.8, and when others, 1.0 v(6): when bgcolor (background color) is not designated, 0.0, and when not designated by 16-scale code, 0.0, and when designated by 16-scale code, bgcolor/0xFFFFF v(7): before ninth row, (row number)×0.1, and after tenth row, 1.0 v(8): before 99-th column, (column number)×0.01, and after 100-th column, 1.0 v(9): when the number of line spaces (<BR>) is below 5, (<BR>number)×0.2, and when <BR>number is above 5, 1.0 v(10): when the number of characters in text is below 100, (number of characters)×0.01, and when above 100, 1.0 v(11): (number of numerals in text)/(total number of characters in text)

v(12): (number of alphabetics in text)/(total number of characters in text)

v(13): (number of Kanji in text)/(total number of characters in text)

v(14) (number of Katakana in text)/(total number of characters in text)

v(15): (number of Hiragana in text)/(total number of characters in text)

v(16): when there is punctuation point "o" or "."). 1.0, and when no punctuation point, 0.0 v(13+i×4): when an area of image, is below 150000, (area)/150000, and when above 150000, 1.0 v(14+i×4): when a height of image, is below 300, (height)/300, and when above 300, 1.0 v(15+i×4): when a width of image, is below 500, (width)/500, and when above 500, 1.0 v(16+i×4): among character rows representing URL of page containing this table, a ratio of partial character rows common to URL of image$_1$. For example, if an image "./image/hoge.gif"" is included in a page "http://hogehoge.aaa.bbbbb.cojp: 8080/hoge1/hoge2/hoge.html (length of URL is 58), when the image is rewritten to fullpass URL, since "http://hogchoge.aaa.bbbbb.co.jp:8080/hoge1/image/hoge.gif"" is obtained, the common character row becomes "http://hogehoge.aaa.bbbbb.ccjp:8080/hoge1/". Since this length is 43, a value of this component becomes 43÷58=0, i.e., 741.

A cell vector storage part 103 is a cell position data storage part for storing cell position data generated by the table analysis part 102. A cell vector storage part 104 serves to store the cell vectors generated by the table analysis part 102.

A table type judgment part 105 serves to judge a type of the table with reference to the cell position data stored in the cell position data storage part 103 and the cell vectors stored in the cell vector storage part 104 and to instruct a cut direction determination part 107 or a cell cluster generation part 111 to start the processing in dependence upon the table type. There are seven table types from table 1 to table VII which will be described below.

Table I: heights and widths of all of the cells are 1, and the cells in first column/n-th row and n-th column/first row are all <TH>or same background color.

table II: heights and widths of all of the cells are 1, and the cells in first column/n-th row and n-th column/first row (except for first column/first row) are all <TH>or same background color.

table III: heights and widths of all of the cells are 1, and the cells in first column/n-th row are all <TH>or same background color.

table IV: heights and widths of all of the cells are 1, and the cells in first column/n-th row (except for first column/first row) are all <TH>or same background color.

table V: heights and widths of all of the cells are 1, and the cells in n-th column/first row are all <TH>or same background color.

table VI: heights and widths of all of the cells are 1, and the cells in n-th column/first row (except for first column/first row) are all <TH>or same background color.

table VII: tables other than table I to table VI.

In the above, the tables I to VI are tables showing tables as they are and the table VII is a table used as a tool for the purpose of layout. When the table type is any one of the tables I to VI, the cut direction determination part 107 is instructed to start the processing, and when the table type is the table VII, the cell cluster generation part is instructed to start the processing.

A table type storage part 106 serves to store the table type determined by the table type judgment part 105.

When the cut direction determination part 107 is instructed to start the processing by the table type judgment part 105, the part 107 judges whether each data is expressed by column or row in the table describing "table", with reference to the cell position data stored in the cell position data storage part 103 and the cell vectors stored in the cell vector storage part 104, thereby determining the table division direction.

A score $S_h(T)$ when a table T of N-th column/M-th row is divided on the basis of column and a score $S_v(T)$ when the table T of N-th column/M-th row is divided on the basis of row are defined as follows. In the following description, $\cos(v_{i,j}, v_{k,1})$ represents a cosine value between a table cell vector v; j in i-tb column/j-th row and a table cell vector $v_{k,1}$ in k-th column/1-th row.

However, these are values calculated only when there are both the data of cell in the i-th column/j-th row and data of cell in the k-th column/1-th row, and if either of both data is not existed, the value becomes zero.

$$exist(i, j) = 1 \text{ (data is existing in the call in the i-th column/j-th row)}$$
$$0 \text{ (data is not existing in the cell in the i-th column/j-th row)}$$

$$count_h = \sum_{i=1}^{N} \sum_{j=1}^{M} \sum_{k=j+1}^{M} exist(i, j) \times exist(i, k)$$

$$count_v = \sum_{j=1}^{M} \sum_{i=1}^{N} \sum_{l=i+1}^{N} exist(i, j) \times exist(l, j)$$

$$S_h T = \frac{1}{count\ h} \sum_{i=1}^{N} \sum_{j=1}^{M} \sum_{k=j+1}^{M} \cos(v_{i,j}, v_{i,k})$$

$$S_v T = \frac{1}{count_v} \sum_{j=1}^{M} \sum_{i=1}^{N} \sum_{l=j=1}^{N} \cos(v_{i,j}, v_{l,i})$$

Since the dimension of the table cell vectors is determined by the number of images includes in the cells in i-th column/j-th row and k-th column/l-th row, the cosine value is calculated by adding component having a value of zero to the lower table cell vectors so that the dimensions of both vectors becomes the same.

$S_h(T)$ is an average cosine value between two cell table cell vectors in the same column, and $S_v(T)$ is an average cosine value between two cell table cell vectors in the same row. Since the cosine values of the two table cell vectors can be regarded as similarity of cells, it is said that $S_h(T)$ is average similarity between the cells in the same segment when the table is divided from column to column and $S_v(T)$ is average similarity between the cells in the same segment when the table is divided from row to row.

Since it is better that the similarity between the cells in the same segment is low in order to incorporate various data in the cells, it is judged that when $S_h(T) \leq S_v(T)$ the table T should be divided from column to column and when $S_h(T) > S_v(T)$ the table T should be divided from row to row.

A cut direction storage part 108 serves to store the cut directions determined by the cut direction determination part 107.

A table segment generation part 109 serves to generate the segment from the table describing the table with reference to the table types stored in the table type storage part 106 and the cut directions stored in the cut direction storage part 108. When the cut direction is column direction, in the table of table V type, the columns are made to segments as they are, and, in the tables other than the table V type, the segment is formed by combining the first column. When the cut direction is row direction, in the table of table III type, the rows are made to segments as they are, and, in the tables other than the table III type, the segment is formed by combining the first row.

A table segment storage part 10 serves to store the table segment generated by the table segment generation part 109.

A cell cluster storage part 111 serves to effect clustering of cells in the table having the purpose of layout with reference to the cell vectors stored in the cell vector storage part 104 when the starting of processing is instructed by the table type determination part 105. Here, sorting of cells is determined by using maximum distance algorithm. Now, the clustering procedure of the maximum distance algorithm will be described.

Step 1: From N (number) sample pattern concurrent $X(=x_1, X_2, \ldots, X_N)$, any one of sample (for example, $x_1$) is selected and is made as cluster center $Z_1 \epsilon \epsilon Z$.

Step 2: Regarding all of $_1 \epsilon X$ not included in Z, among cluster centers $Z_1 \epsilon Z$, a distance $dx_j$ to the nearest cluster center is calculated. It is assumed that $x_i$ giving $Max\{dx_1\}$ is $Y_0$.

Step 3: Regarding all of $z_k \epsilon z$, among cluster centers other than $z_k$, a distance $dz_k$ to the furthest cluster center is calculated.

Step 4: When $dx_c \geq max\{dz_k\} \times t$ (t=0.5 to 1) is established, it is regarded as a new cluster center, and the algorithm is returned to Step 2 to select next cluster center. If $dx_c < max\{dz_k\} \times t$ (t=0.5 to 1), the algorithm goes to Step S.

Step 5: All of $x_1 \epsilon x$ is stored to clusters of the nearest $z_1 \epsilon z$.

Figure 4:
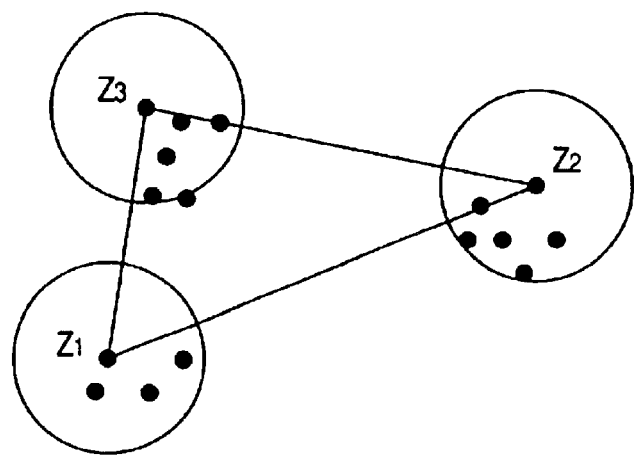
FIG. 4 is a view for explaining a maximum distance algorithm.

An example of a clustering result based on the maximum distance algorithm is shown in FIG. 4.

A cell cluster information storage part 112 serves to store cell cluster information generated by the cell cluster generation part 111.

A layout segment generation part 113 serves to generate the segments from the table having purpose of layout with reference to the cell position data stored in the cell position data storage page 103 and the cell cluster information stored in the cell cluster information storage part 112.

The merit of arranging the information by utilizing the types of the tables is that longitudinal and lateral repeating of a certain arrangement pattern can easily be attained. Thus, the arrangement pattern is guessed on the basis of the cell cluster information, and the segment is obtained by combining the cells matched to the pattern, because, when a certain arrangement pattern appears repeatedly, it can be judged that the cells matched to said pattern are resembled meaningly. Details of processing will now be described.

First of all, a fundamental cell kind is determined, and cells in the fundamental cell kind are regarded as fundamental cells. The fundamental cell kind is selected as a cell kind having least number of cells among cell kinds including a plurality of same cells. If there are a plurality of cell kinds in question, the leftmost or uppermost cell kind is selected.

Then, it is ascertained whether any cell having the same kind of the cell adjacent to the fundamental cell is adjacent to another fundamental cell or not. If adjacent, the fundamental cells are connected to obtain a new fundamental cell. This procedure is repeated until the cells cannot be interconnected.

When the above-mentioned process is finished, the fundamental cell and the remaining cells are made to segments, respectively.

A layout segment storage part 114 serves to store the layout segments generated by the layout segment generation part 113. The table segments stored in the table segment storage part 110 and the layout segments stored in the layout segment storage part 114 are segments eventually obtained.

Figure 2:
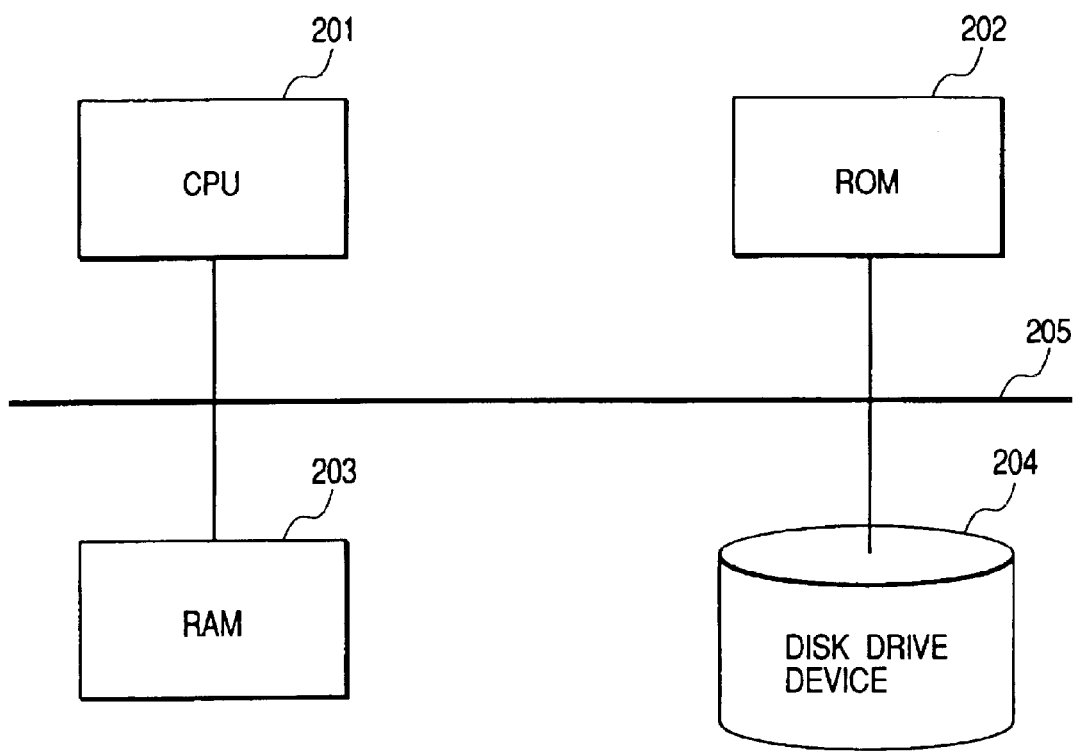
FIG. 2 is a block diagram showing a hardware construction of the document segmentation apparatus according to the first embodiment.

FIG. 2 is a view showing a hardware arrangement of the document segmentation apparatus according to the illustrated embodiment.

In FIG. 2, a CPU 201 serves to effect the processing in accordance with program stored in a ROM 202. The ROM 202 serves to store program performing control procedure which will be described later. A RAM 203 serves to provide storing areas required for operating the cell position data storage part 103, cell vector storage part 104, table type storage part 106, cut direction storage part 108, cell cluster information storage part 112 and the aforementioned program.

A disk drive device 204 serves to realize the HTML table storage part 101, table segment storage part 110, and layout segment storage part 114. A bus 205 serves to connect between the above-mentioned elements and permit sending and receiving of data between the elements.

Figure 3:
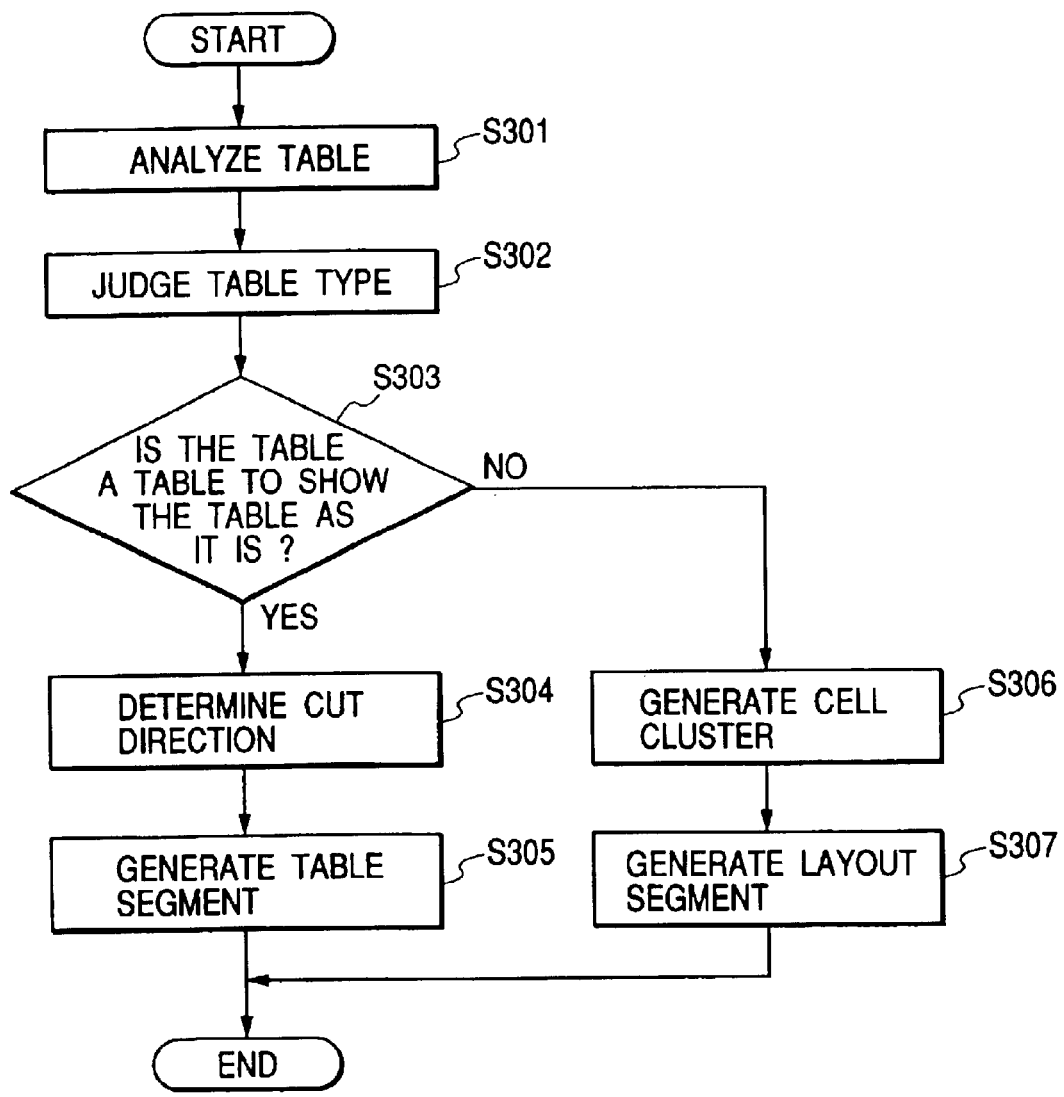
FIG. 3 is a flow chart showing a procedure of the document segmentation processing according to the first embodiment.

Next, a processing operation of the illustrated embodiment will be explained. FIG. 3 is a flow chart showing an operation procedure of the document segmentation apparatus according to the illustrated embodiment.

In step S301, the tables stored in the HTML table storage part 101 are analyzed to generate the cell position data representing the positional relationship between the cells and the cell vectors representing characteristics of the cells. Then, the program goes to step S302.

In step S302, the table type is determined with reference to the cell position data stored in the cell position data storage part 103 and the cell vectors stored in the cell vector storage part 104. Then, the program goes to step S302.

In step S303, it is judged whether the table to be processed is the table describing the table or not with reference to the table types stored in the table type storage part 106. If the table is the table describing the table, the program goes to step S304. If not, the program goes to step S306.

J In step S304, it is determined whether the data in the table describing the table are represented by column or row with reference to the cell position data stored in the cell position data storage part 103 and the cell vectors stored in the cell vector storage part 104, thereby determining the dividing direction of the table. Then, the program goes to step S305.

In step S305, the segments are generated from the table showing the table as it is with reference to the table types stored in the table type storage part 106 and the cut directions stored in the cut direction storage part 108, and the operation is finished.

In step S306, the cells in the table used as a tool for the purpose of layout are clustered with reference to the cell vectors stored in the cell vector storage part 104. Then, the program goes to step S307.

In step S307, the segments are generated from the table describing the table with reference to the cell position data stored in the cell position data storage part 103 and the cell cluster information stored in the cell cluster information storage part 112, and the operation is finished.

As mentioned above, by analyzing the table to be processed to judge whether the table is the table describing the table or the table having purpose of layout and by generating the segments by effecting the processing for obtaining the target table, the tables in the HTML document can be divided according to their contents.

[Alterations]

In the above-mentioned embodiments, while an example that the maximum distance algorithm is used for effecting the clustering of the cells was explained, the present invention is not limited to that example, but the clustering may be effected by using other algorithms.

The definition of the components of the cell vectors shown in the illustrated embodiment is merely one example, and the characteristics of the cells may be expressed by other definitions.

The definition of score for determining the cut direction shown in the illustrated embodiment is merely one example, and the cut direction may be determined by other definitions.

In the illustrated embodiment, while an example that the height and width of the cell, kind of the tag (TH or TD) and the background color are used to determine the column (or row) of the item name for determining the table type was explained, the present invention is not limited to such an example, but judgment may be effected by using other attributes.

In the illustrated embodiment, while an example that the cell position data storage part 103, cell vector storage part 104, table type storage part 106, cut direction storage part 108 and cell cluster information storage part 112 are realized by the RAM and the HTML table storage part 101, table segment storage part 110 and layout segment storage part 114 are realized by the disk drive device was explained, the present invention is not limited to such an example, but these may be realized by using any recording medium.

In the illustrated embodiment, while an example that the HTML table is divided was explained, so long as the contents of the table can be discriminated, another type of table may be divided.

In the illustrated embodiment, while an example that the elements are incorporated into the same computer was explained, the present invention is not limited to such an example, but the elements may be individually incorporated into computers or processing devices included in a network.

In the illustrated embodiment, while an example that the program is stored in the ROM was explained, the present invention is not limited to such an example, but, the program may be stored in any recording medium. Further, the program may be realized by any circuit performing the same operation.

[Second Embodiment]

Figure 5:
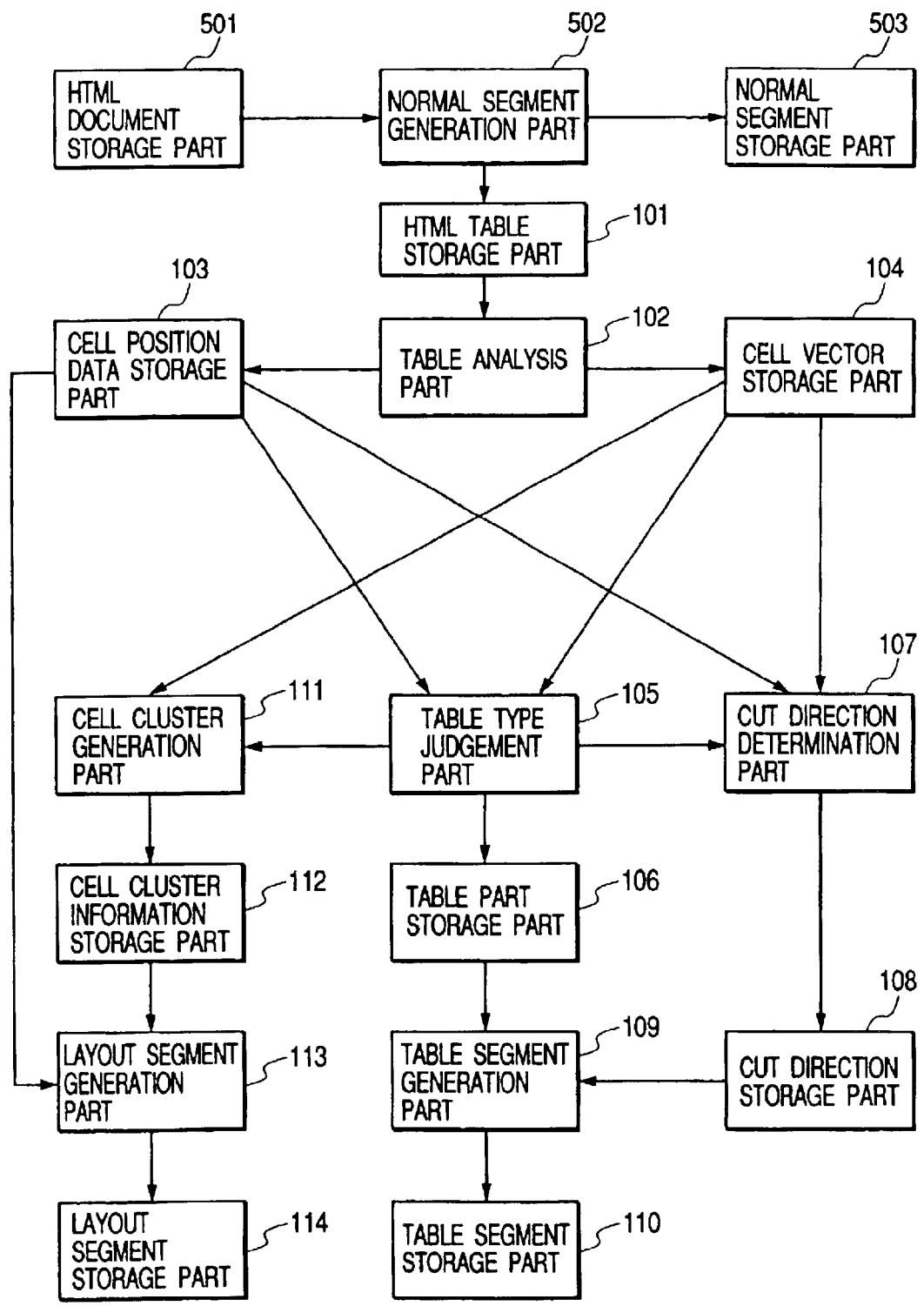
FIG. 5 is a block diagram showing a functional construction according to a second embodiment of the present invention.

In the above-mentioned embodiment, while an example in which the apparatus serves to divide only HTML tables was explained, the present invention is not limited to that example. For example, the present invention may be realized as an apparatus for dividing the entire HTML document. FIG. 5 is a block diagram showing the fundamental construction in an example of such a case.

In FIG. 5, an HTML document storage part 501 serves to store an HTML document to be processed. A normal segment generation part 502 serves to divide the HTML document stored in the HTML document storage part 501 into segments. A normal segment storage part 503 serves to store segments other than tables generated by the normal segment generation part 502. An HTML table storage part 101 serves to store segments of tables generated by the normal segment generation part 502. Other parts are the same as those shown in FIG. 1.

In FIG. 5, the normal segments stored in the normal segment storage part 503, the table segments stored in the table segment storage part 110 and the layout segments stored in the layout segment storage part 114 are the segments eventually obtained.

[Third Embodiment]

Figure 6:
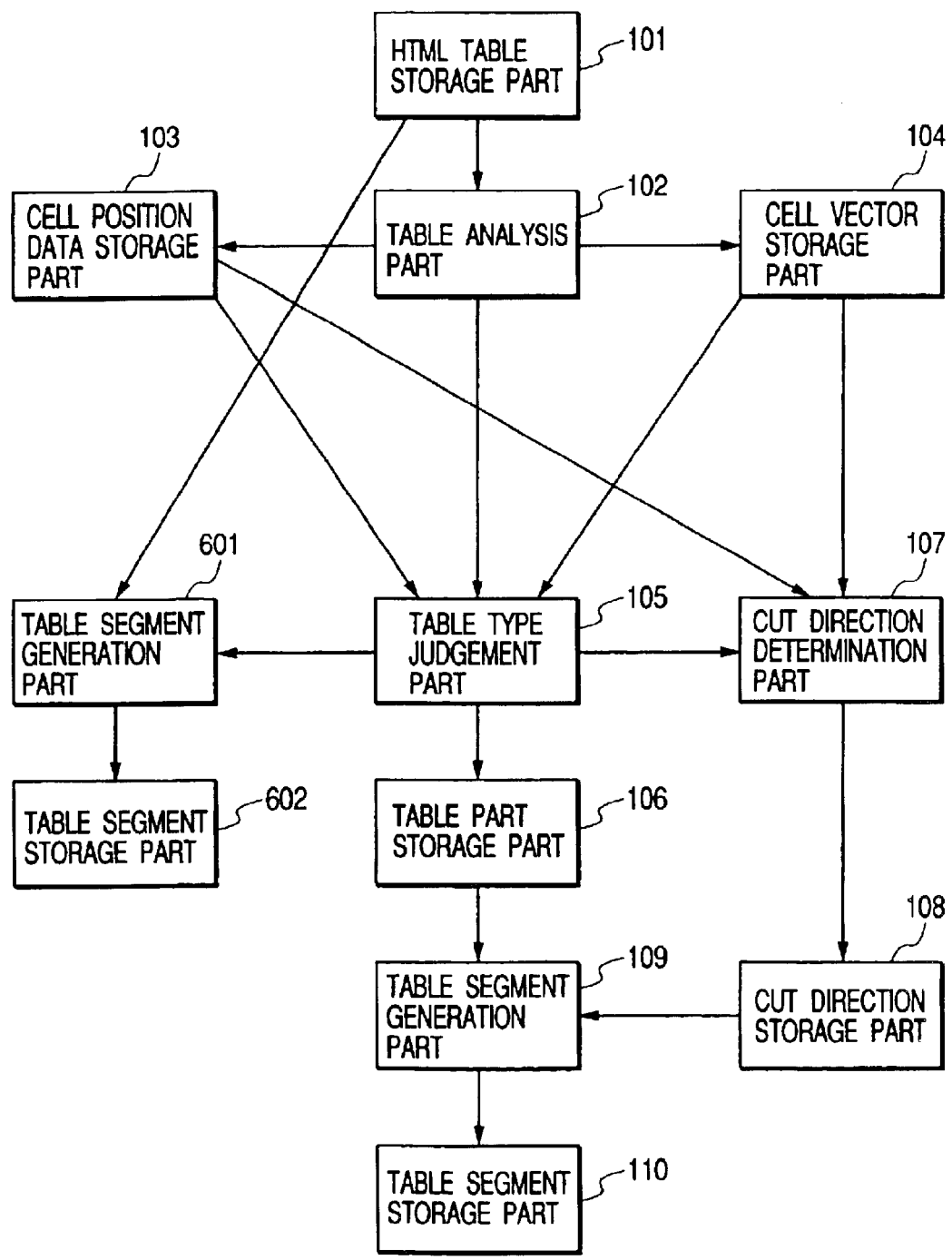
FIG. 6 is a block diagram showing a functional construction according to a third embodiment of the present invention.

101181 In the above-mentioned embodiments, while an example in which both table tags actually showing a table and table tags used as a tool for the purpose of layout are divided into segments was explained, the present invention is not limited to that example. For example, only a table that is an actual table may be divided. FIG. 6 is a block diagram showing the fundamental construction in an example of such a case.

In FIG. 6, when a table segment generation part 601 is instructed to start processing from a table type judgment part 105, it generates an HTML table stored in an HTML table storage part 101 as table segments.

A table segment storage part 602 serves to store table segments generated by a table segment generation part 611. Other parts are the same as those shown in FIG. 1.

In FIG. 6, the table segments stored in the table segment storage part 110 and the table segments stored in the table segment storage part 602 are the segments eventually obtained.

[Fourth Embodiment]

Figure 7:
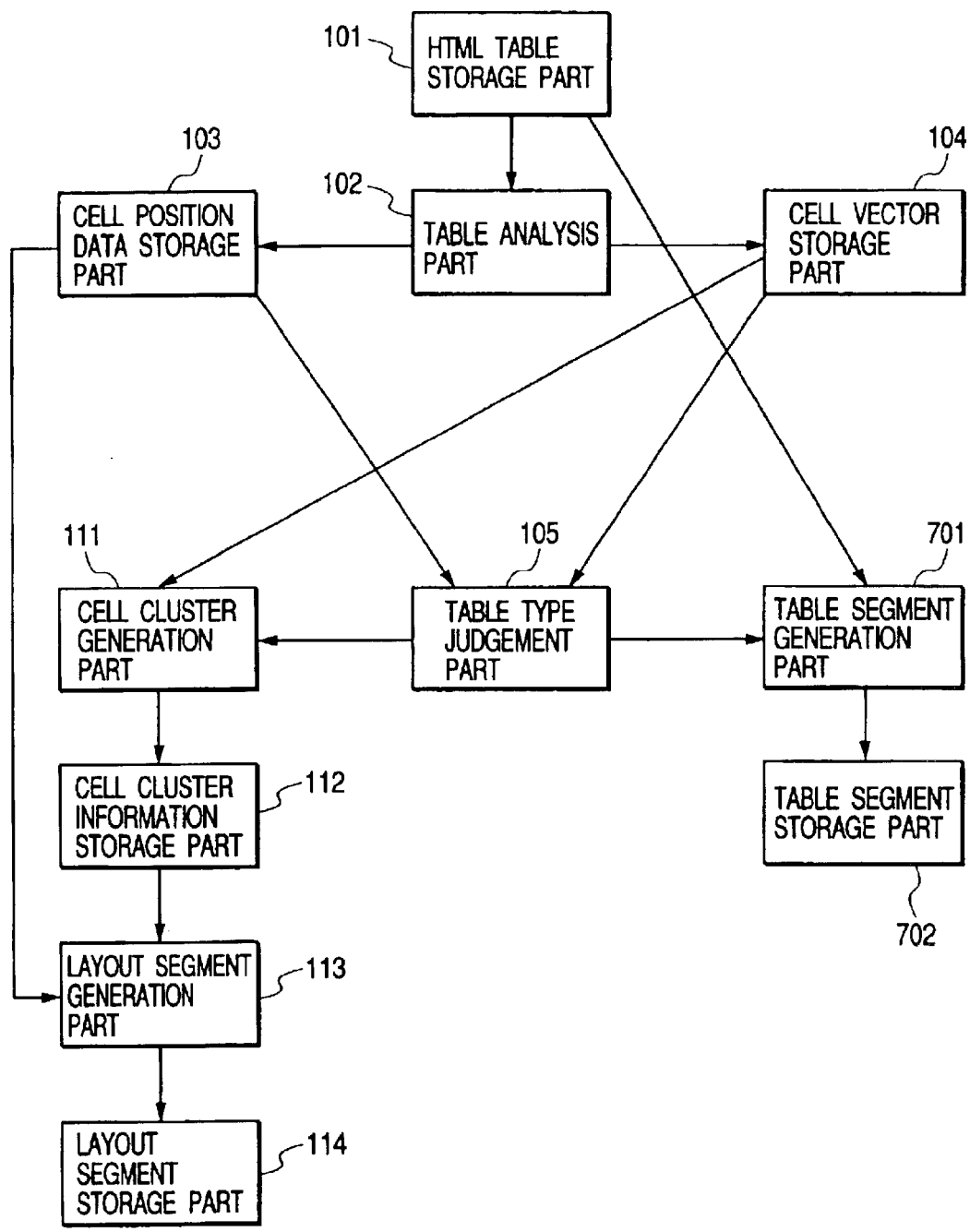
FIG. 7 is a block diagram showing a functional construction according to a fourth embodiment of the present invention.

In the above-mentioned embodiments, while an example in which both table formatting that is used to Show an actual table and table formatting used as a tool for the purpose of layout are divided into segments was explained, only the table used as a tool for the purpose of layout may be divided. FIG. 7 is a block diagram showing the fundamental construction in an example of such a case.

In FIG. 7, when a table segment generation part 701 is instructed to start processing from a table type judgment part 705, it generates an HTML table stored in an HTML table storage part 101 as table segments. A table segment storage part 702 serves to store table segments generated by a table segment generated part 706. Other parts are the same as those shown in FIG. 1.

In FIG. 7, the table segments stored in the table segment storage part 702 and the layout segments stored in the layout segment storage part 114 are the segments eventually obtained.

Incidentally, in the above-mentioned embodiment, while an example in which the present invention is applied to apparatus for dividing the HTML document was explained, the present invention is not limited to that example, but the present invention may be realized as a segment retrieving apparatus in which retrieval can be effected for each segment unit by combining the dividing apparatus with a retrieving apparatus.

[Fifth Embodiment]

In the above-mentioned embodiments, while an example in which the judgment as to whether the table formatting is for providing an actual table or not is effected only on the basis of the syntax of the table, was explained.

However, among the HTML documents tables, since there are also tables in which table items are not described by emphasizing characters to permit discrimination as TH tags or item name, it is possible that a table formatting that is being used for describing an actual table may be erroneously judged as being for layout. In such a case, the approach based only on the syntax has a limitation as to judging whether the table represents an actual table or not.

Now, referring to an example shown in FIG. 8, since meanings between the cells are analogous with each other, it can be seen that each cell forms an element for one item. In this way, among the HTML document tables, there are also tables which can be discriminated as ones showing actual tables by semantics.

Thus, in a fifth embodiment of the present invention, the judgment as to whether a table Shows an actual table or not is effected on the basis of semantics.

Figure 9:
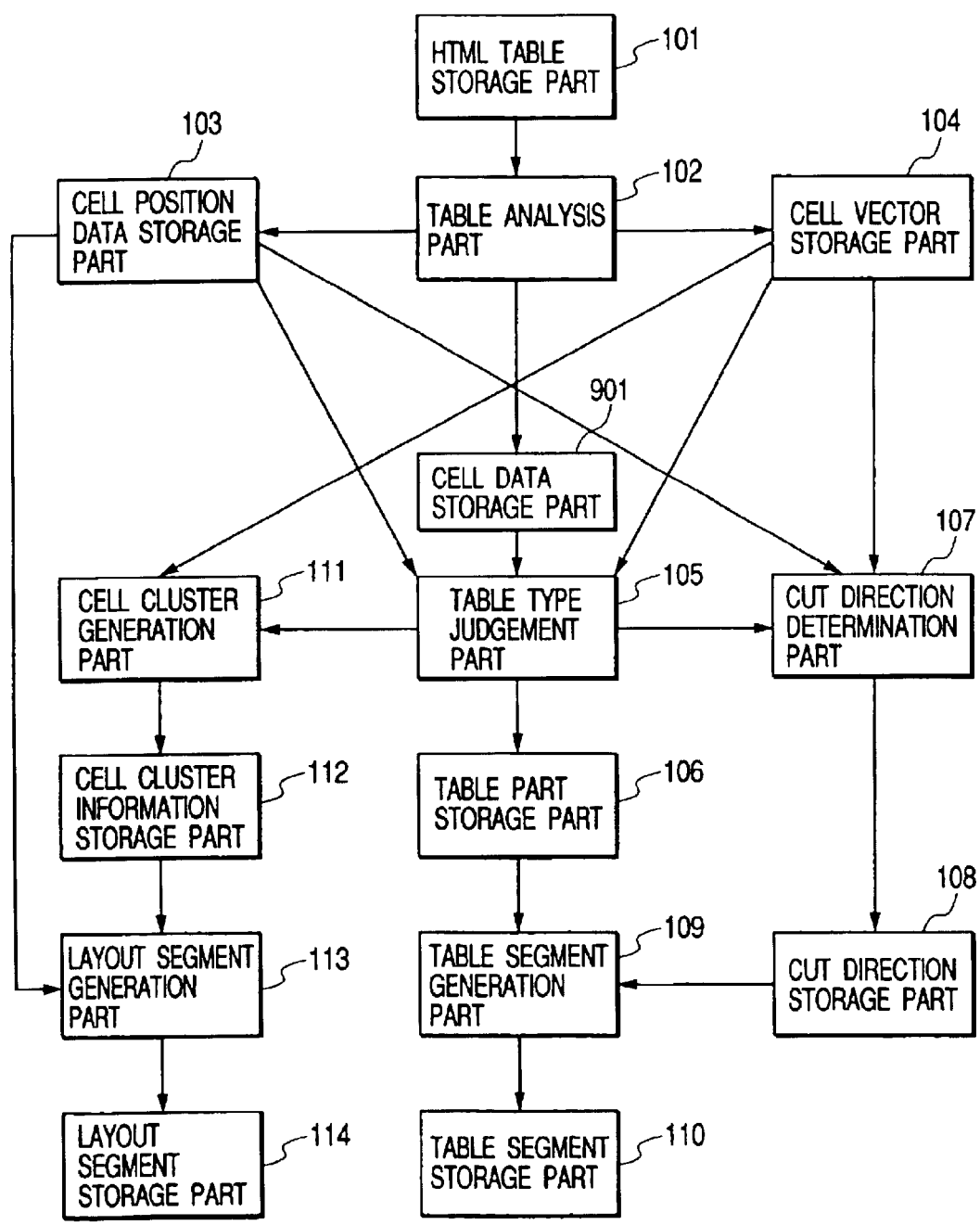
FIG. 9 is a block diagram showing a functional construction according to a fifth embodiment of the present invention.

FIG. 9 is a block diagram showing a construction of an apparatus according to the fifth embodiment.

In a table analysis part 102, a table stored in an HTML table storage part 101 is analyzed to generate cell position data representing a positional relationship between cells, cell vectors representing characteristics of the cells and data for cells. A cell data storage part 901 serves to store the cell data generated by the table analysis part 102. Other parts are the same as those shown in FIG. 1.

The processing procedure according to the illustrated embodiment is effected in accordance with the flow chart shown in FIG. 3, as in the first embodiment. However, since there are slight differences in detail from the first embodiment, such differences will be described.

In step 301, the table stored in the HTML table storage part 101 is analyzed to generate cell position data representing a positional relationship between cells, cell vectors representing characteristics of the cells and data for cells. Then the program goes to step S302.

In step S302, the table type is determined with reference either the cell position data stored in the cell position storage page 103 or the cell vectors stored in the cell vector storage part 104 or the cell data stored in the cell data storage page 901, and the program goes to step S303.

Here, the determination of the table type includes determination of table type on the basis of a thesaurus, determination of table type on the basis of similarity of character, determination of table type on the basis of syntax and determination of table type on the basis of coincidence of character. An operation for determining the table type will be described in connection with embodiments which will be described below. Step S303 and other steps are the same as those in the first embodiment.

Figure 10:
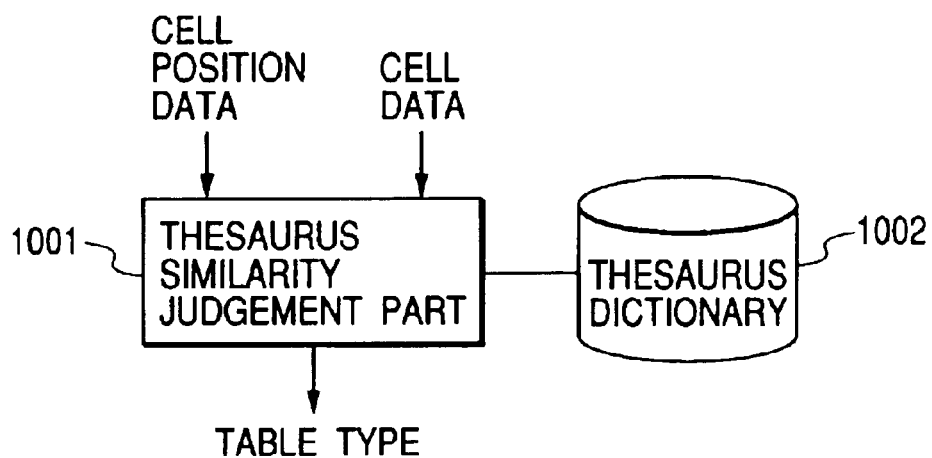
FIG. 10 is a block diagram showing a construction of a table type judgment part according to the fifth embodiment.

In the illustrated embodiment, the table judgment part 105 includes a thesaurus similarity judgment part 1001 and a thesaurus dictionary 1002. Now, its operation will be explained with reference to FIG. 10.

The term "thesaurus" is a word meaning a high/low rank relationship between vocabularies. Words include high rank words, which are more abstract, a synonym for a given word (no change in meaning even if expressed by the other word), analogous words, which are similar in meaning, and low rank words, which are more concrete. For example, a word "morning glory" includes "flower" as the high rank word and "violet", "convolvulus" and "balsam" as analogous words. The word "flower" includes "violet", "convolvulus" and "balsam" as low rank words.

The thesaurus similarity judgment part 1001 serves to judge the table type on the basis of thesaurus similarity described in the thesaurus dictionary 1002 with reference to the cell position data stored in the cell position data storage part 103 and the cell data stored in the cell data storage part 115, and the judged table type is stored in the table type storage part 106.

Now, the judgment of the table type based on the thesaurus similarity will be explained with reference to an example of an M column/N row table.

A function for obtaining score based on the thesaurus for two character lines s1, s2 is expressed as f(s1, s2). When the character line s2 is the synonym or analogous word with the character line s1, the value of f(s1, s2) becomes maximum. It is assumed that, as the character line s2 with respect to the character line s1 becomes gradually deeper in the high rank word direction or the low rank word direction, the value f(s1, s2) becomes smaller.

When it is assumed that a character line of m-th column/n-th row cells is the average score of thesaurus for cells in the first row can be expressed as follows:

$$\frac{2}{M(M-1)} \sum_{i=1}^{M} \sum_{j=i+1}^{M} f(S_{i,1}, S_{f,2})$$

Similarly, the average score of thesaurus for cells in the first column can be expressed as follows:

$$\frac{2}{N(N-1)} \sum_{i=1}^{N} \sum_{j=i+1}^{N} f(S_{i,1}, S_{1,j})$$

If the average score of thesaurus for cells in the first column or row exceeds a threshold value, it is judged that the table formatting is being used for describing an actual table, and, if the average score does not exceed the threshold value, it is judged that the table formatting is being used for describing the layout. In this way, the table type of the table to be processed can be judged.

As a method for obtaining the score based on similarity of character regarding two character lines s1, s2, there is a method called "vague retrieval".

A function for obtaining score based on the similarity of character for two character lines s1, s2 is expressed as g(s1, s2). When it is assumed that if the similarity of character is great, the value of g(s1, s2) becomes greater and if the similarity of character is small, the value of g(s1, s2) becomes smaller, by using the vague retrieval, similar to the method for obtaining the score on the basis of the thesaurus: if the average score of similarity of character for cells in the first column or row exceeds a threshold value, it is judged as being an actual table, and if the average score does not exceed the threshold value, it is judged that the table formatting is being used for describing the layout. In this way, the table type of the table to be processed can be judged.

In the illustrated embodiment, regarding the table to be processed, first of all, the judgment of the table based on the thesaurus is effected, and, if the table is an actual table, the procedure is ended, while, if the table is not an actual table, the table judgment based on the similarity of character is effected regarding the table to be processed.

In this way, the table type of the table to be processed can be effected on the basis of the thesaurus similarity.

Figure 11:
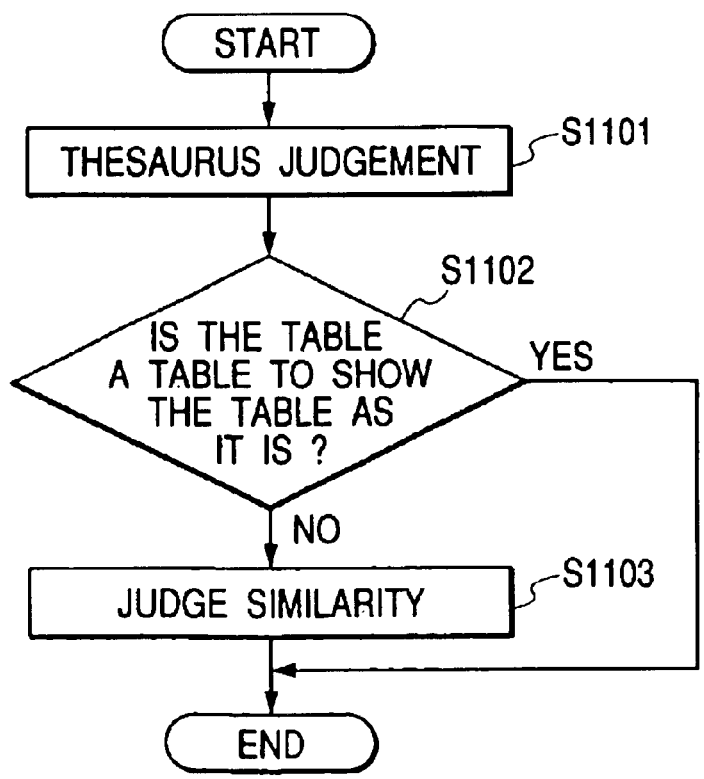
FIG. 11 is a flow chart showing a procedure of a table type judgment processing according to the fifth embodiment.

Now, the details of the table judgment in step S302 will be explained with reference to FIG. 11.

In step S1101, from the cell position data stored in the cell position data storage part 103 and the cell data stored in the cell data storage part 901, the type of the table to be processed is judged on the basis of the thesaurus, and, if the table is an actual table, the procedure is ended, while, if the table is not an actual table, the program goes to step S1102.

In step S1102, from the cell position data and the cell data, the type of the table to be processed is judged on the basis of the similarity of character. Then, the procedure is ended.

Here, an example of the table of a page regarding "How to Rear Flowers" shown in FIG. 8 will be explained. First of all, the average scores of thesaurus for cells in the first column and the first row are measured. In the first column, it can be seen that words "violet", "morning glory" and "balsam" are included. These words are words having to do with flowers. Accordingly, the average score of thesaurus regarding the cells in the first column becomes great, and, thus, this table can be judged as being an actual table.

Next, an example of a table regarding "A Page of Products Catalog" shown in FIG. 12 will be explained. First of all, the average scores of similarity of character for cells in the first column and the first row are measured. In the first column, it can be seen that words "AAA0001", "AAA0002" and "AAA1001" are included. These words are analogous words. Accordingly, the average score of similarity of character regarding the cells in the first column becomes great, and, thus, this table can be judged as being an actual table.

As mentioned above, by analyzing the table to be processed on the basis of the semantics to judge whether the table is describing the table or one having the purpose of layout and by generating the segments accordingly, the table in the HTML document can be divided to produce segments differing from each other in content.

[Sixth Embodiment]

Figure 13:
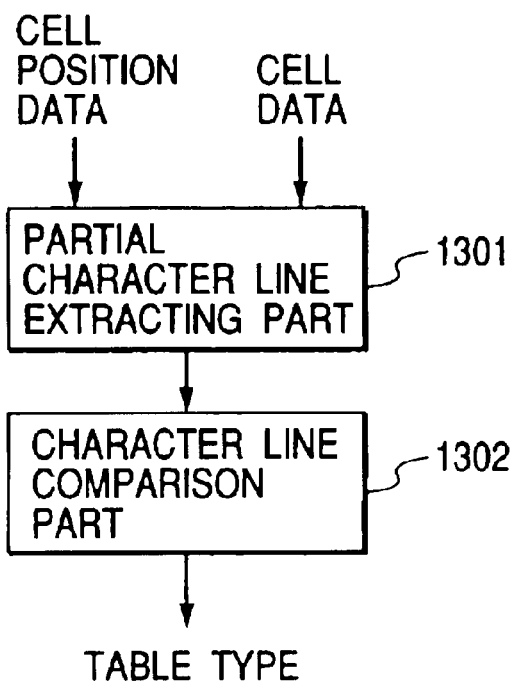
FIG. 13 is a block diagram showing a construction of a table type judgment part according to a sixth embodiment of the present invention.

In a sixth embodiment of the present invention, a table judgment portion 105 includes a partial character line extracting part 1301 and a character line comparison part 1302. Its operation will be explained with reference to FIG. 13.

In the partial character line extracting part 1301, partial character lines of the cells are extracted with reference to the cell position data stored in the cell position data storage part 103 and the cell data stored in the cell data storage part 901. The extraction of the partial character line is effected by using a known method, such as geometric element analysis.

In the character line comparison part 1302, the partial character lines of the cells extracted in the partial character line extracting part 1301 are compared, so that the table type is judged depending upon whether the character lines coincide with each other in many cells or not. The judged table type is stored in the table type storage part 106.

Now, the judgment of the table type based on the character line comparison will be explained with reference to an example of an M-th column/N-th row table.

A function for obtaining coincidence of character line regarding two character lines s1, s2 is expressed as h(s1, s2). It is assumed that, if h(s1, s2)≠0, the two character lines do not coincide, and, if h(s1, s2)=0, the two character lines do coincide with each other.

When it is assumed that a character line of m-th column/n-th row cell is $S_{m,n}$ and a k-th partial character line from the top when $S_{m,n}$ is divided into the partial character lines is $S^k_{m,n}$, an average of coincidence of character line regarding the last character lines of the cells in the first column can be expressed as follows:

$$\frac{1}{M(M-1)}\sum_{i=1}^{M}\sum_{j=i+1}^{M}|h(S^m_{i,1}, S^n_{j,1})|$$

$S^m_{i,j}$, $S^n_{j,1}$ represent the last partial character lines in the respective character lines. Similarly, an average of coincidence of character line regarding the last character lines of the cells in the first row can be expressed as follows:

$$\frac{1}{N(N-1)}\sum_{i=1}^{N}\sum_{j=i+1}^{N}|h(S^m_{1,i}, S^n_{1,j})|$$

If the average of coincidence of character line regarding the cells in the first column or the first row does not exceed a threshold value, it is judged as being an actual table, and, if the average exceeds the threshold value, it is judged as the table describing the layout. In this way, the type of the table to be processed can be judged. After the processing, the judged table type is stored in the table type storage part 106. In this way, the table type can be judged on the basis of the character line comparison.

Figure 14:
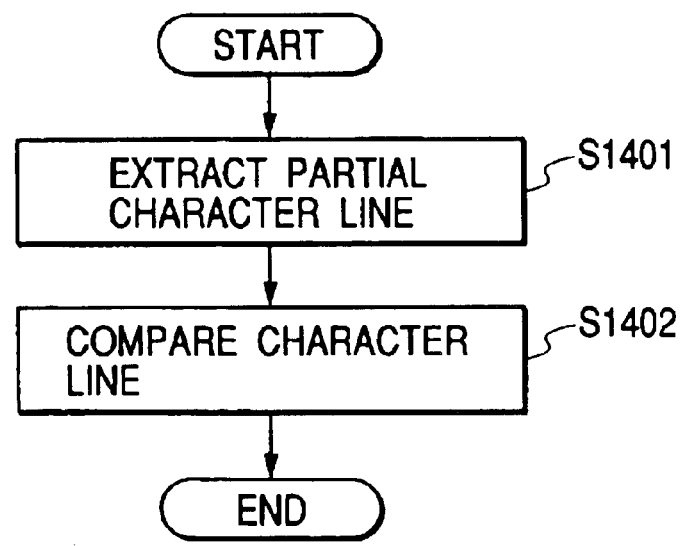
FIG. 14 is a flow chart showing a procedure of a table type judgment processing according to the sixth embodiment.

Now, the details of the table judgement in step S302 will be explained with reference to FIG. 14.

In step S1401, from the cell position data and the cell vectors, the partial character line is extracted. And, the program goes to step S1402.

Instep S1402, the partial character lines of the cells are compared, and the table type is judged depending upon whether the character lines are coincided with each other in many cells or not. And the procedure is ended.

Now, an example of a table regarding "A Page of Medical Centers" shown in FIG. 15 will be explained.

First of all, the cells in the first column and the first row are divided into partial character lines by using the geometric element analysis. When the cells in the first row are divided into the partial character lines, "A clinic", "B clinic" and "C clinic" are obtained. When the character line comparison is effected between the last partial character lines of the cells, since "clinic" coincides, the average of coincidence of character line regarding the cells in the first row becomes small, and, thus, it can be judged as the table describing the table.

As mentioned above, by analyzing the coincidence of partial character line of cells to judge whether the table to be processed is the table showing the table or the table having purpose of layout and by generating the segments accordingly, the table in the HTML document can be divided from content to content.

[Seventh Embodiment]

Figure 16:
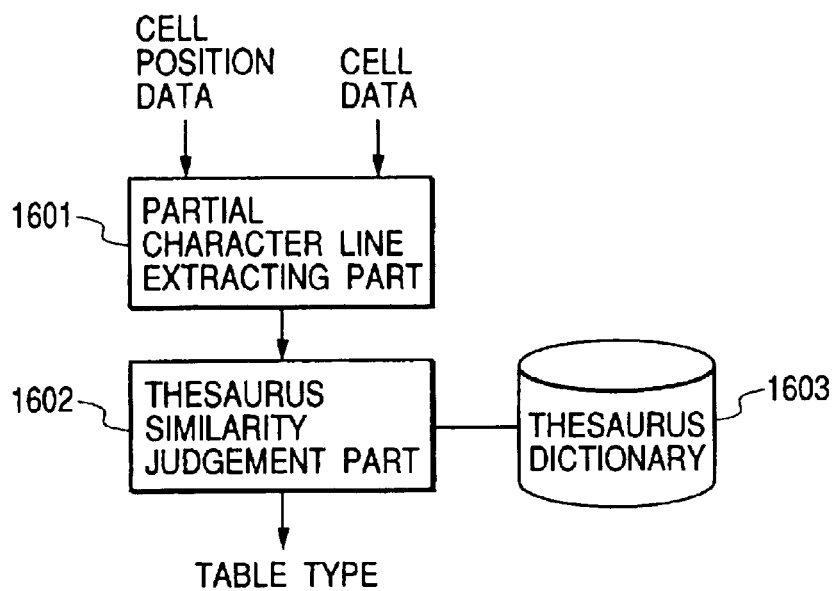
FIG. 16 is a block diagram showing a construction of a table type judgment part according to a seventh embodiment of the present invention.

In a seventh embodiment of the present invention, a table judgement portion 105 includes a partial character line extracting part 1601, thesaurus similarity judgement part 1602, and a thesaurus dictionary 1603. An operation will be described with reference to FIG. 16.

In the partial character line extracting part 1301, a partial character lines are extracted with reference to the cell position data stored in the cell position data storage part 103 and the cell data stored in the cell data storage part 115.

In the thesaurus similarity judgement part 1602, regarding the partial character lines of the cells extracted in the partial character line extracting part 1301, the table type is judged on the basis of thesaurus similarity of the thesaurus dictionary 1603, and the judged table type is stored in the table type storage part 106.

Figure 17:
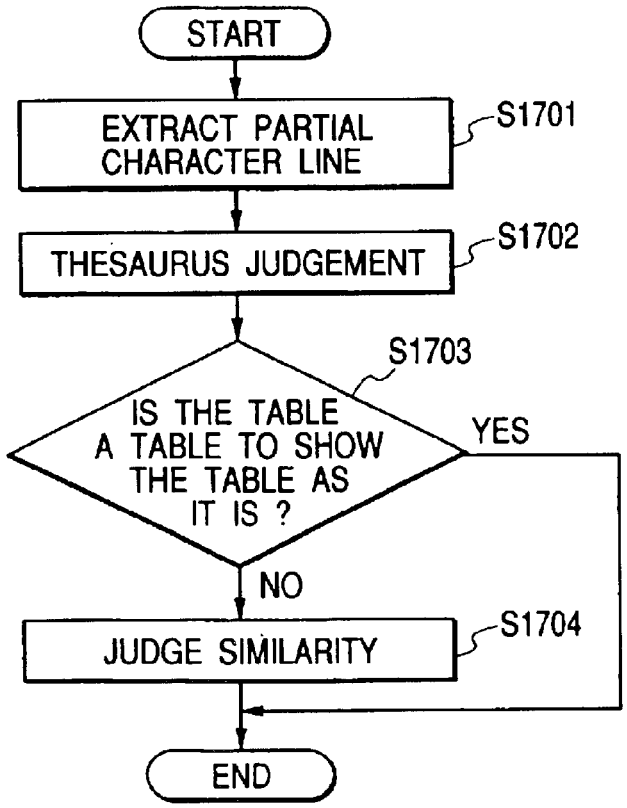
FIG. 17 is a flow chart showing a procedure of a table type judgment processing according to the seventh embodiment.

Now, the details of the table judgement in step S302 will be explained with reference to FIG. 17.

In step S1701, from the cell position data and the cell vectors, the partial character line is extracted. And, the program goes to step S1702.

In step S1702, regarding the partial character liens of the cells, the table judgement based on thesaurus is effected. As a result, in step 1703, if the table is the table describing the table, the procedure is ended; otherwise, the program goes to step S11704.

In step S1704, regarding the partial character lines of the cells, the table judgement based on similarity of character is effected. And, the procedure is ended.

As mentioned above, by judging the table type of the table to be processed on the basis of the thesaurus similarity regarding the partial character lines of the cells to judge whether the table is the table showing the table or the table having purpose of layout and by generating the segments accordingly, the table in the HTML document can be divided from content to content.

[Eighth Embodiment]

Figure 18:
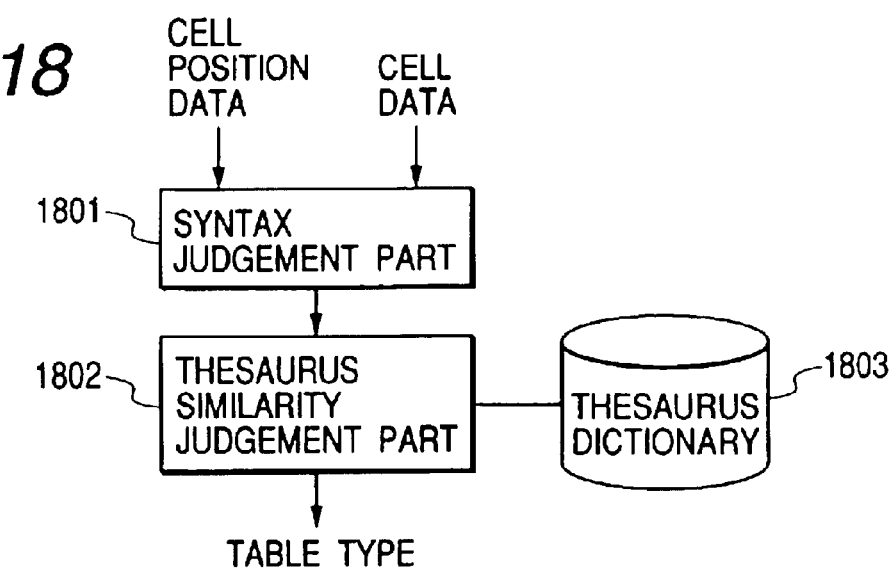
FIG. 18 is a block diagram showing a construction of a table type judgment part according to an eighth embodiment of the present invention.

In an eighth embodiment of the present invention, a table judgement portion 105 includes a syntax judgement part 1801, a thesaurus similarity judgement part 1802, and a thesaurus dictionary 1803. An operation will be described with reference to FIG. 18.

The syntax judgement part 1801 serves to effect the processing similar to the table type judgement part 105 of the first embodiment. After the processing in the syntax judgement part 1801 or the thesaurus similarity judgement part 1802, the judged table type is stored in the table type storage part 106.

Figure 19:
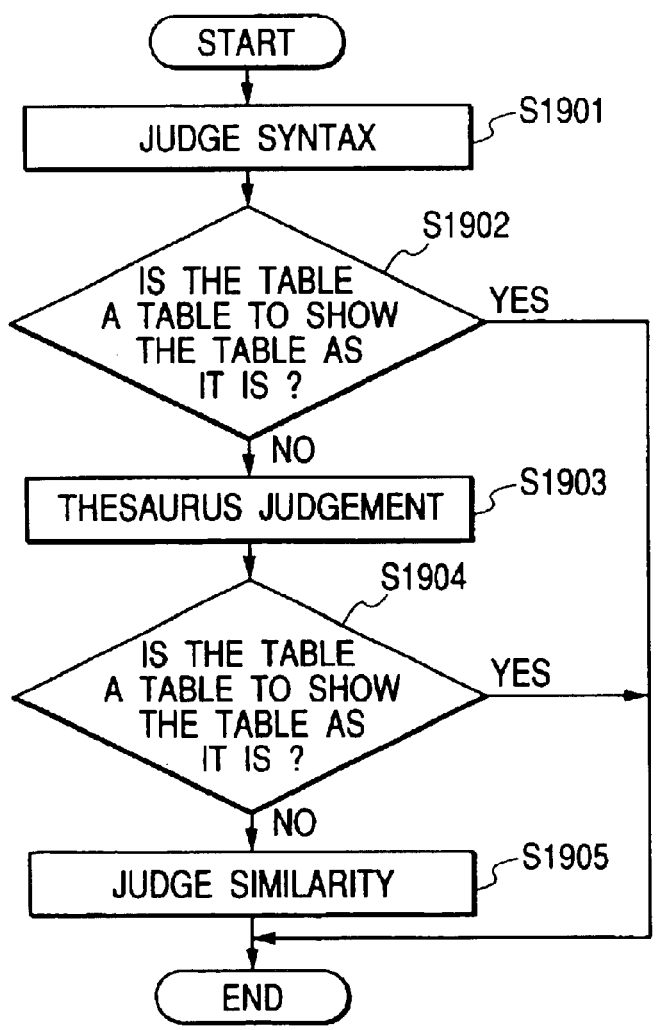
FIG. 19 is a flow chart showing a procedure of a table type judgment processing according to the eighth embodiment.

Now, the details of the table judgement in step S302 will be explained with reference to FIG. 19.

In step S1901, from the cell position data and the cell vectors, the table type is judged on the basis of syntax. As a result, in step 1902, if the table is the table describing the table, the procedure is ended; otherwise, the program goes to step S11903.

In step S1903, from the cell position data and the cell vectors, the table type is judged on the basis of thesaurus. As a result, in step 1904, if the table is the table describing the table, the procedure is ended; otherwise, the program goes to step S1905.

In step S1905, from the cell position data and the cell vectors, the table type is judged on the basis of similarity of character. And, the procedure is ended.

As mentioned above, by analyzing the table type of the table to be processed on the basis of syntax and semantics to judge whether the table is the table showing the table or the table having purpose of layout and by generating the segments accordingly, the table in the HTML document can be divided from content to content.

[Ninth Embodiment]

Figure 20:
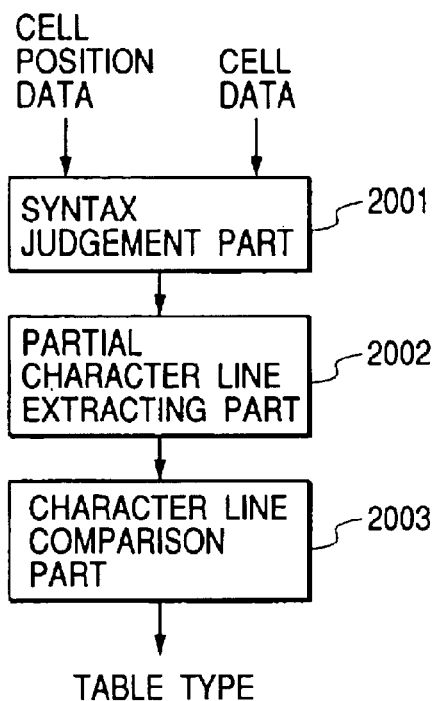
FIG. 20 is a block diagram showing a construction of a table type judgment part according to a ninth embodiment of the present invention.

In a ninth embodiment of the present invention, a table judgment portion 105 includes a syntax judgment part 2001, a partial character line extracting part 2002, and a character line comparison part 2003. An operation will be described with reference to FIG. 20.

The syntax judgment part 1801 serves to effect the processing similar to the table type judgment part 105 of the first embodiment. The partial character line extracting part 2002 and the character line comparison part 2003 serve to effect the processing similar to the partial character line extracting part 1301 and the character line comparison part 1302 of the sixth embodiment. After the processing in the syntax judgment part 2001 or the character line comparison part 2003, the judged table type is stored in the table type storage part 106.

Figure 21:
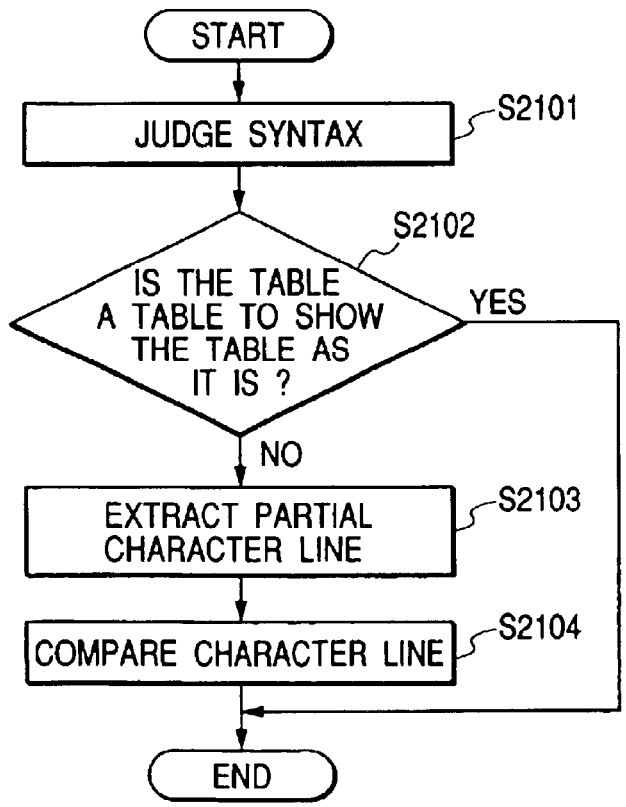
FIG. 21 is a flow chart showing a procedure of a table type judgment processing according to the ninth embodiment.

Now, the details of the table judgment in step S302 will be explained with reference to FIG. 21.

In step S2101, from the cell position data and the cell vectors, the table type is judged on the basis of syntax. As a result, if the table is the table describing the table, the procedure is ended; otherwise, the program goes to step S2102.

In step S2102, from the cell position data and the cell vectors, the partial character lines are extracted, and, in step S2103, the partial character lines of the cells are compared, so that the table type is judged depending upon whether the partial character lines coincide with each other in many cells or not. Then, the procedure is ended.

As mentioned above, by analyzing the table type of the table to be processed on the basis of syntax and the coincidence of the partial character line to judge whether the table is the table describing the table or the table having purpose of layout and by generating the segments accordingly, the table in the HTML document can be divided from content to content.

[Tenth Embodiment]

In a tenth embodiment of the present invention, a table judgement portion 105 includes a syntax judgement part 2201, a partial character line extracting part 2202, a thesaurus similarity judgement part 2203 and a thesaurus dictionary. An operation will be described with reference to FIG. 22.

The syntax judgement part 2201 serves to effect the processing similar to the table type judgement part 105 of the first embodiment. The partial character line extracting part 2202 and the thesaurus similarity judgement part 2203 serve to effect the processing similar to the partial character line extracting part 1601 and the thesaurus similarity judgement part 1602. After the processing in the syntax judgement part or the thesaurus similarity judgement part, the judged table type is stored in the table type storage part 106.

Figure 23:
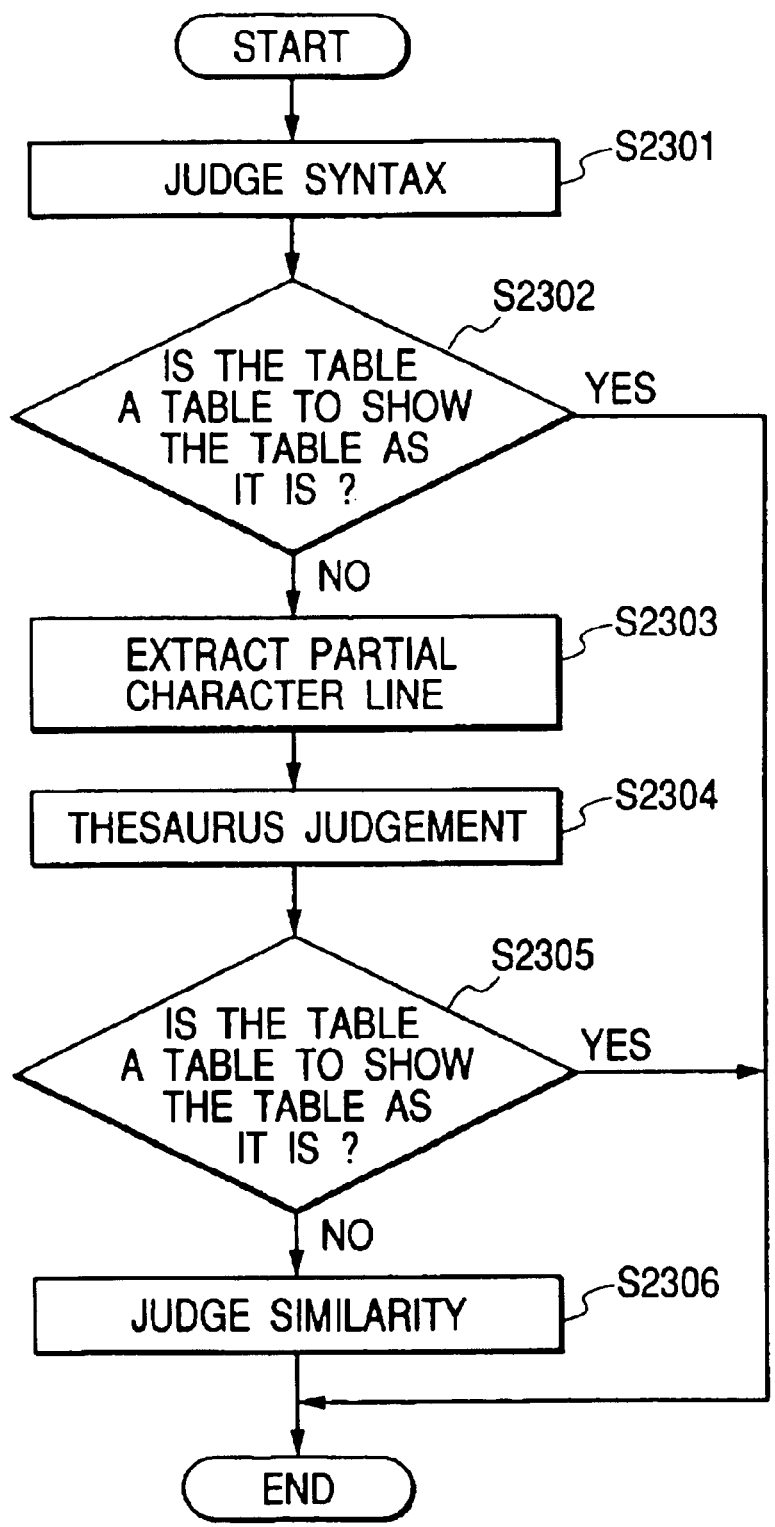
FIG. 23 is a flow chart showing a procedure of a table type judgment processing according to the tenth embodiment.

Now, the details of the table judgement in step S302 will be explained with reference to FIG. 23.

In step S2301, from the cell position data and the cell vectors, the table type is judged on the basis of syntax. As a result, in step S2302, if the table is the table describing the table, the procedure is ended; otherwise, the program goes to step S2303.

In step S2303, from the cell position data and the cell vectors, the partial character lines are extracted, and, in step S2304, regarding the partial character lines of the cells, the table judgement is effected on the basis of thesaurus. As a result, in step S2305, if the table is the table describing the table, the procedure is ended; otherwise, the program goes to step S2306. In step S2306, regarding the partial character lines of the cells, the table judgement is effected on the basis of similarity of character. And, the procedure is ended.

As mentioned above, by analyzing the table type of the table to be processed on the basis of syntax and analyzing the partial character lines of the cells to judge whether the table is the table describing the table or the table having purpose of layout and by generating the segments accordingly, the table in the HTML document can be divided from content to content.

In the above-mentioned embodiments, when the judgement whether the table is the table describing the table or not, by utilizing the table judgement based on semantics as well as the table judgement based on syntax, regarding many tables, it is possible to judge whether such table is the table describing the table or not.

[Eleventh Embodiment]

Now, naming regarding the table will be briefly described.

"Record" is information representing one substance, and a group of records representing similar substances constitute record concurrence. Of course, styles of the records in the record concurrence are the same. The record is constituted by fields (data) representing attributes of the substances. For example, "Taro Yamada: Yokohama-city: 045-000-0000" is a record constituted by three fields. "Hanako Yamada: Kawasaki-chi: 044-111-1111" is also a record representing a person in the same manner as the above record. The concurrence constituted by these two records is recorded concurrence.

In order to discriminate the fields, since first field, second field and the like are difficult to be understood, naming is frequently used. The naming or title given to the field is called as a field name. For example, in the aforementioned record, it is assumed that the field name of the first field is "(person's) name", second field is "address" and third field is "phone number". Thus, in the first record, a field value of the field name "name" is "Taro Yamada" and a field value of the field name "address" is "Yokohama-city".

Figures 22, 24:
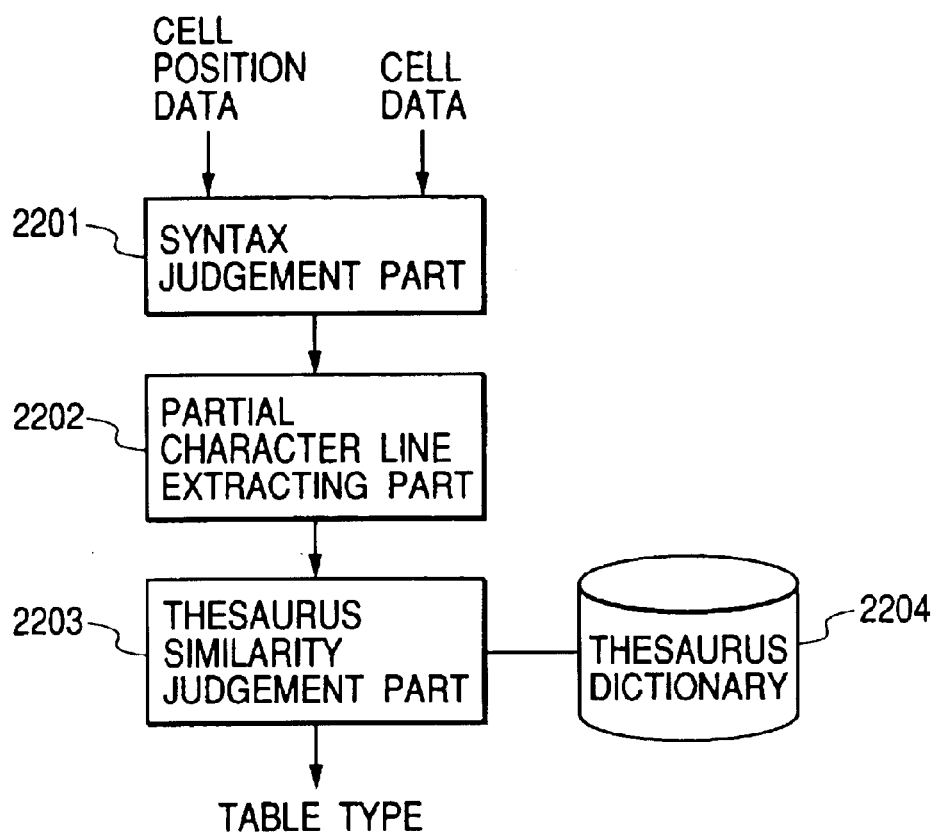
FIG. 22 is a block diagram showing a construction of a table type judgment part according to a tenth embodiment of the present invention.
FIG. 24 is a view showing an example of a table in an HTML document.

Data actually representing the record concurrence is shown in FIG. 24. In case of the HTML document, the table is concretely described as a table (table is data described by TABLE tags). FIG. 24 shows an example of the record concurrence described by the table.

In this example, while each column of the table describes one record, there is a case where the rows describe the records. However, since the column and the row may be interchanged, i.e., the column and the row may be converted with respect to a diagonal of the table, in the following explanation, it is regarded that the records are described in the column direction. In the case where the columns represent the records, the readings of column and row are changed, the same result is achieved. In the table shown, the first line describes the fields names of the fields. Such a line is referred to as a field name describing line (i.e., line with the field name). The second and third lines describe one record, respectively. Such a line is referred to as a record describing line (i.e., line with record).

In the aforementioned embodiments, in order to judge whether the table is the table describing the table is or not, the judgement was effected under a assumption of the table in which M columns and N rows are not omitted and regular description is made. However, among the tables in the HTML document, there are tables in which a plurality of tables are included in one table or the record straddles between plural table. Further, there are also multi-row and multi column tables in which, when the adjacent informations are the same, the informations are gathered to be described as single information. Regarding such tables, the table judgement cannot be effected easily.

For these tables, by analyzing a structure of the table and regularity of information description constituting the table, and by reforming the table regularly in M columns and N rows, the table can be divided correctly.

Figure 25:
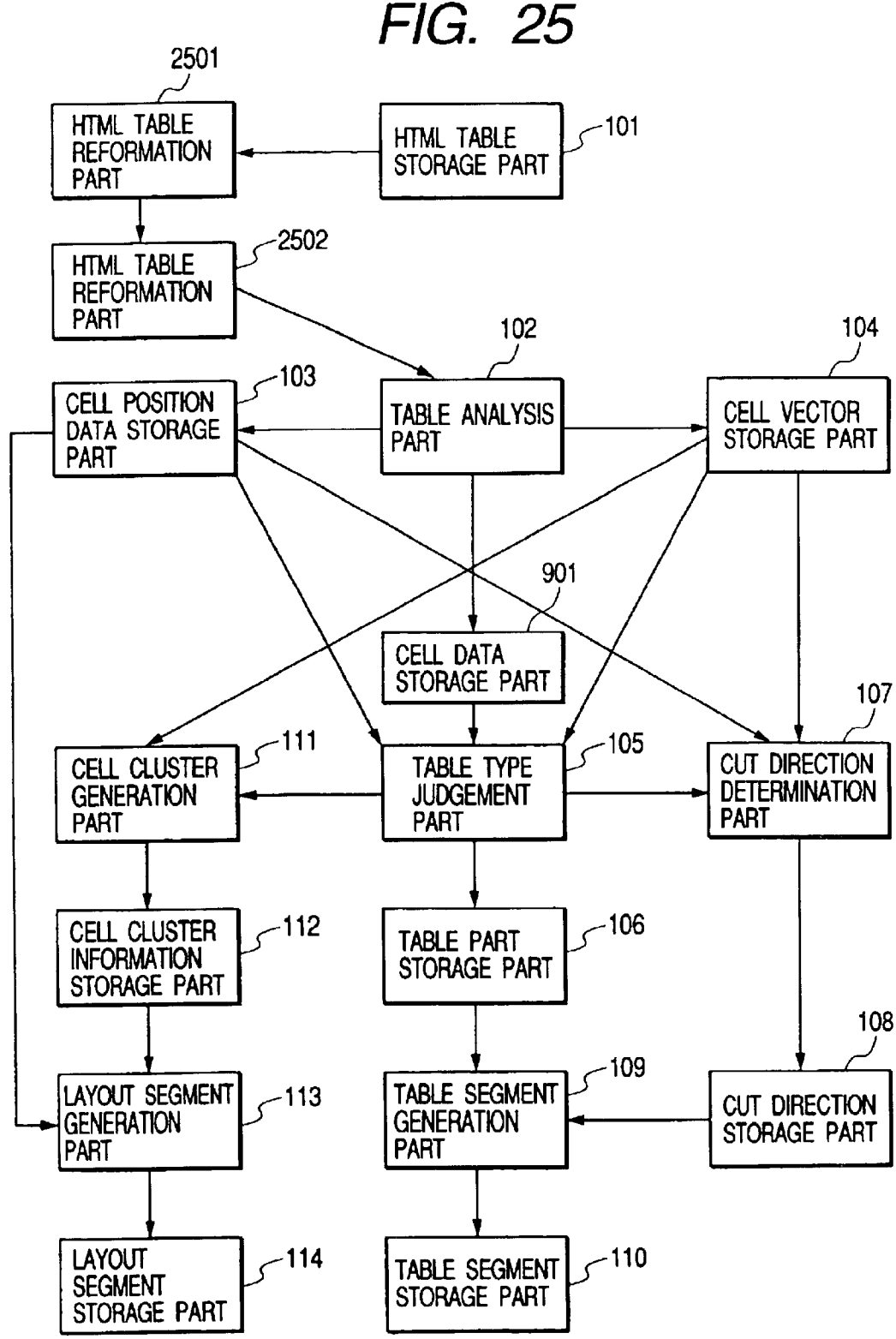
FIG. 25 is a block diagram showing a functional construction of a document segmentation apparatus according to an eleventh embodiment of the present invention.

FIG. 25 is a block diagram showing a construction of an apparatus according to an embodiment of the present invention.

An HTML table reformation part 2501 serves to reform a table stored in the HTML table storage part 101 regularly without omission of M columns and N rows by analyzing the structure of the table and regularity of information description constituting the table.

An HTML table reformation data storage part 2502 serves to store data of the HTML table reformed in the HTML table reformation part 2501.

A table analysis part 102 serves to analyze the table stored in the HTML table reformation data storage art 2502 thereby to generate cell position data indicating a positional relationship between the cells, and cell vectors representing characteristics of the cells and data of the cells. The other constructions are the same as those shown in FIG. 1.

Figure 26:
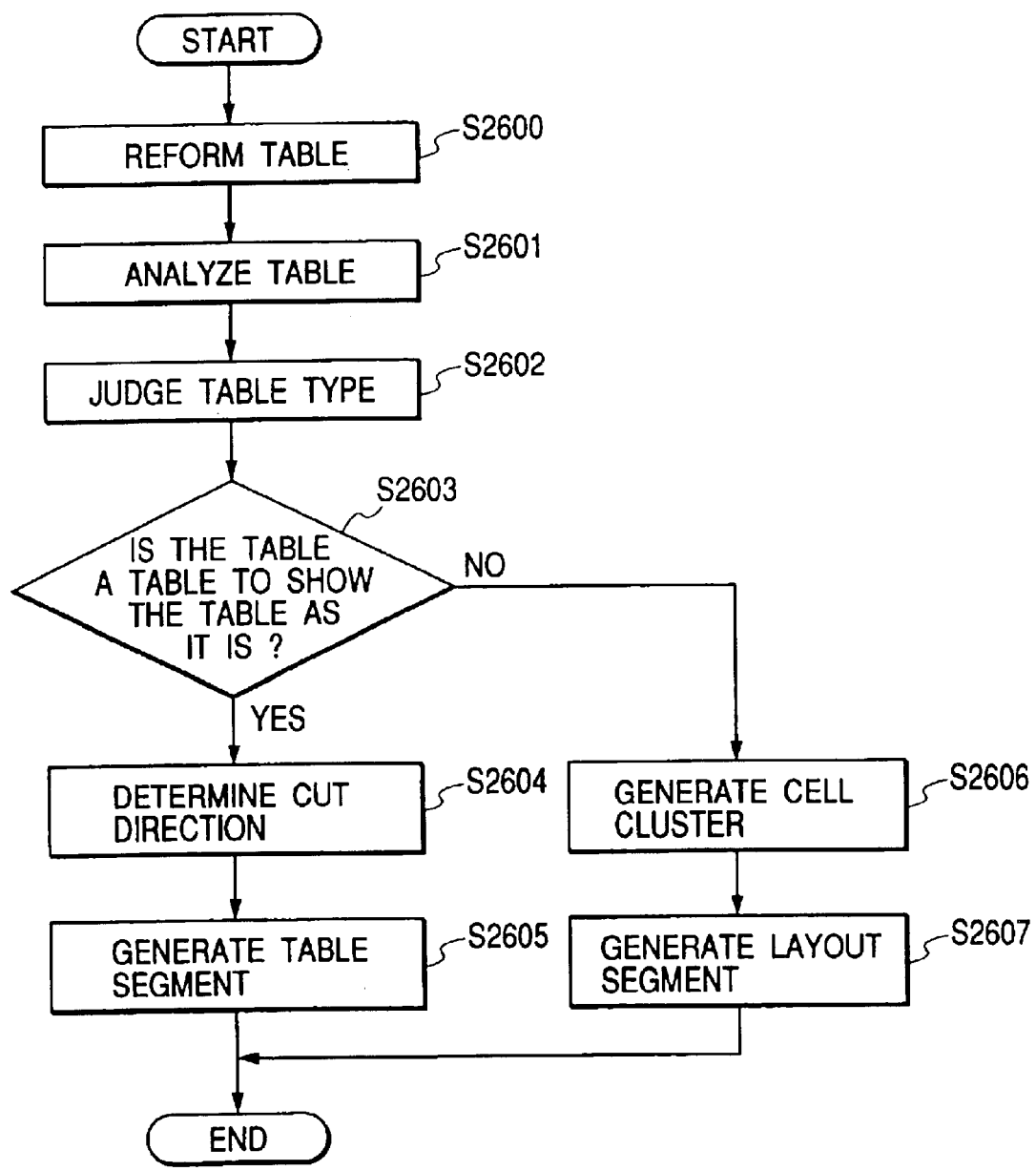
FIG. 26 is a flow chart showing a procedure of the document segmentation processing according to the eleventh embodiment.

Next, an operation of the document dividing apparatus according to the illustrated embodiment will be explained with reference to a flow chart shown in FIG. 26.

In step S2600, regarding the table stored in the HTML table storage part 101, by analyzing the structure of the table and regularity of information description constituting the table, the table is reformed regularly without omission of M columns and N rows. And, the program goes to step S2601.

The table reformation includes table reformations based on supplementary data removal, treatment of a multi-row/multi-column table and treatment of a composite table. In the illustrated embodiment, the table reformation is effected by the supplementary data removal. The table reformations based on the treatment of a multi-row/multi-column table and treatment of a composite table will be described in connection with other embodiments. Steps S2601 to S2607 are the same as steps S301 to S307 in FIG. 3.

In the illustrated embodiment, the supplementary data removal is effected by the HTML table reformation part 2501. Here, referring to the table data stored in the HTML table storage part 101, unnecessary data added to the table in the table is removed.

Figure 27:
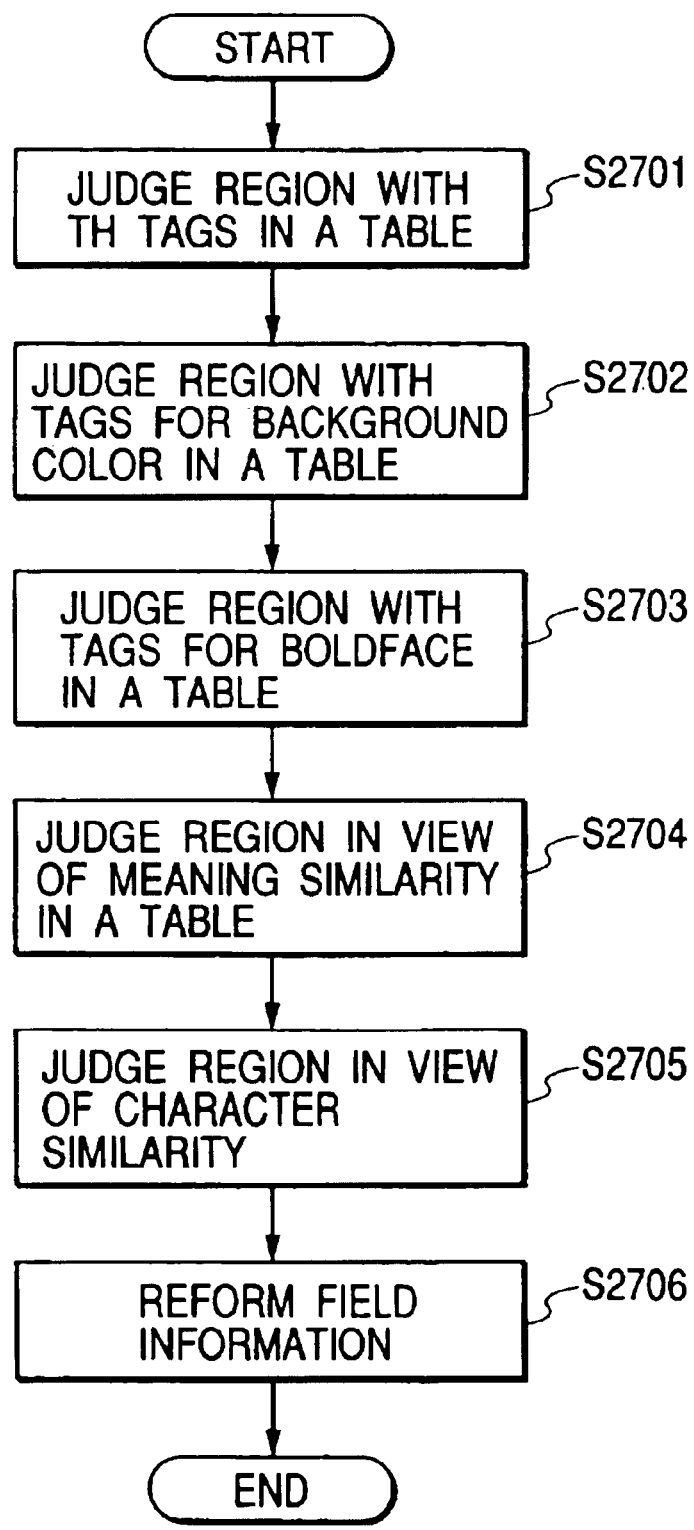
FIG. 27 is a flow chart showing a procedure for HTML table reformation according to the eleventh embodiment.

Next, the details of the HTML table reformation in step S2600 will be explained with reference to FIG. 27.

In step S2701, a region of the field name describing line (line with field name) with the TH tags is judged, and in step S2702, a region of the field name describing line with tags describing the background color is judged, and, in step S2703, a region of the field name describing line with tags for bold face is checked, and the program goes to step S2704.

In step S2704, on the basis of the regions of the lines with the field name checked in steps S2701 to S2703, meaning similarity between the field names of the lines with the field name and fields perpendicular to the describing directions of the lines with the field name is calculated. Since the field having high score of similarity is description in the field name, by judging the region having high score of similarity, the region in the table is judged. In step S2705, the similarity of character line is calculated in the same procedure as step S2704 to judge the region in the table.

In step S2706, on the basis of the regions in the table checked in steps S2704 to S2705, excessive data other than the table is removed.

Now, the operation for the supplementary data removal will be described by using a sample. FIG. 28 Shows a page of "How to Rear Flowers", in which the supplementary data other than the table are added to the first and fourth columns.

First of all, in steps S2701 to S2703, the lines with the field name are specified. In FIG. 28, since there are field name describing lines with bold face in the second line, by the processing in step S2703, it is judged that the second line is the field name describing line.

Then, in steps S2704 and S2705, the region in the table, i.e., a range of the field value regarding the field name is specified on the basis of the similarity of thesaurus or similarity of character line. In FIG. 28, from third to fifth lines in the first column, since "violet", "morning glory" and "balsam" which are the field values regarding the field name "flower name" are described, by the processing in step S2704, it is judged that the table has the region corresponding to second to fifth lines.

Lastly, by the processing in step S2706, by removing the supplementary data out of the region in the table, the contents of the table can be picked up.

As mentioned above, regarding the table to be processed, by analyzing the structure of the table and regularity of information description constituting the table and by reforming the table regularly in M columns and N rows, the table can be divided correctly.

[Twelfth Embodiment]

In a twelfth embodiment of the present invention, the HTML table reformation part 2501 effects the multi-row/multi-column table treatment. Here, by analyzing the structure of the table with reference to the table data stored in the HTML table storage part 101, the table is reformed regularly without omission of M columns and N rows.

Next, the details of the HTML table reformation in step S2600 will be explained with reference to FIGS. 29A to 29E.

Figure 29A:
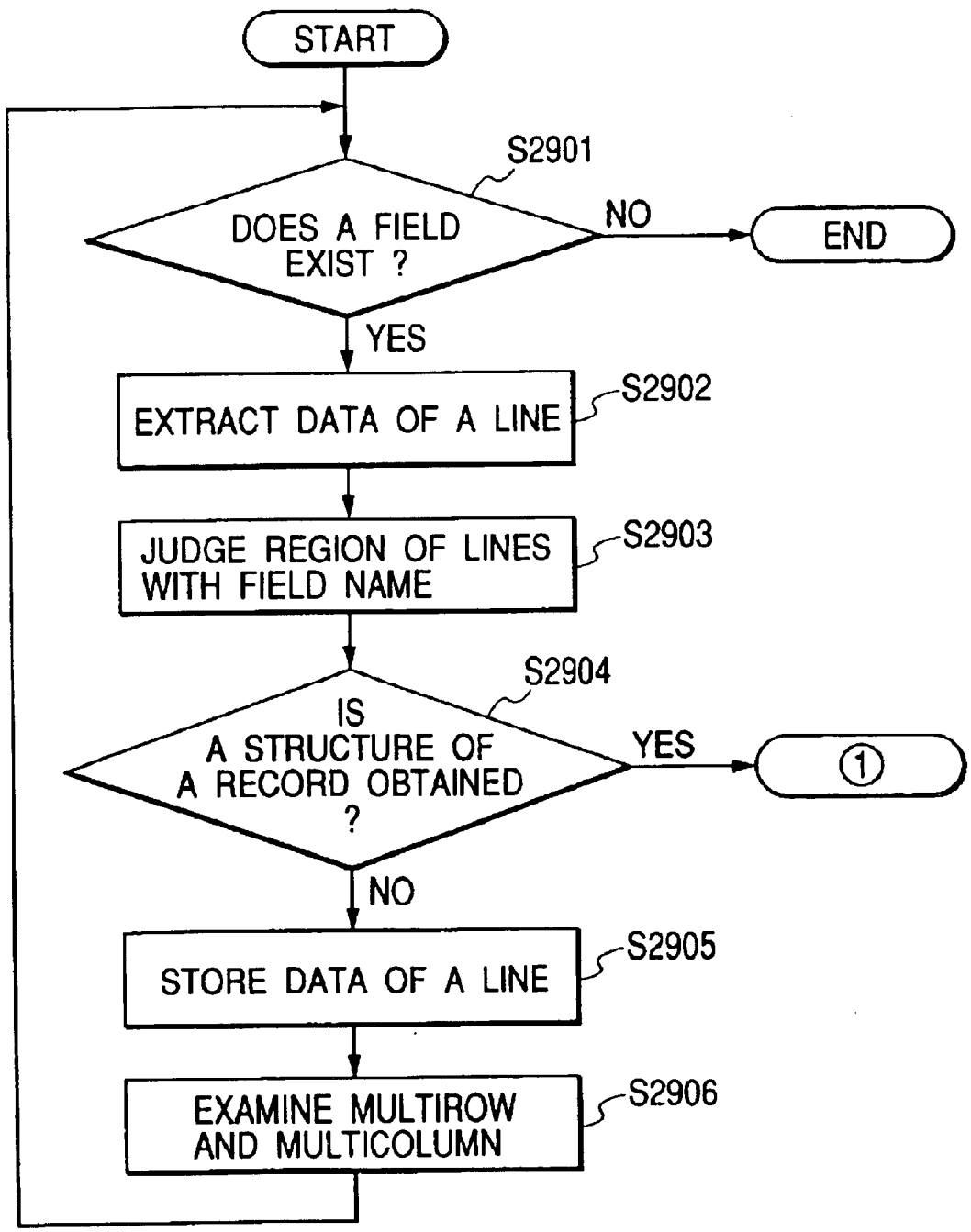
FIGS. 29A, 29B, 29C, 29D and 29E are flow charts showing a procedure for HTML table reformation according to a twelfth embodiment of the present invention.
Figure 29B:
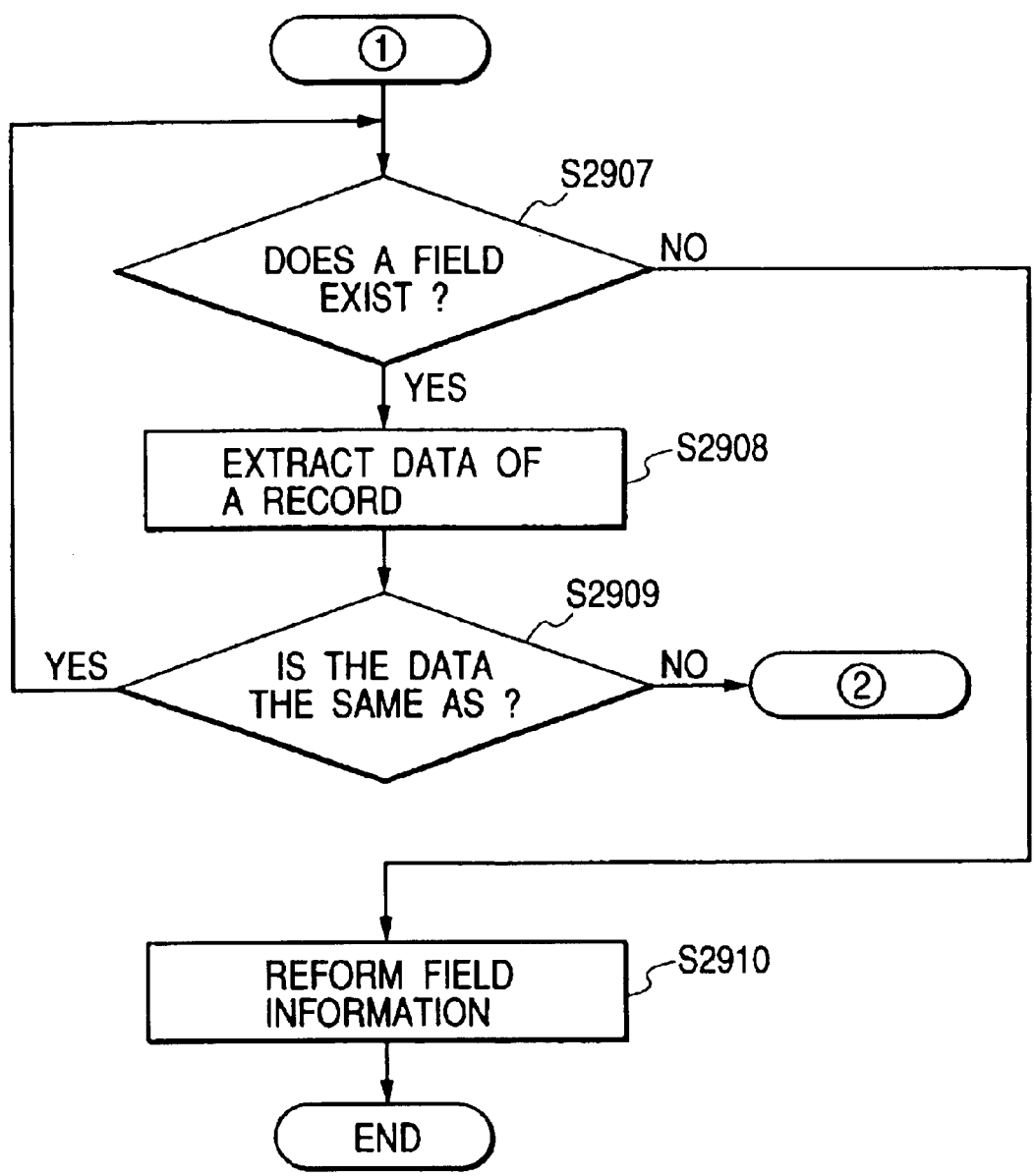
Figure 29C:
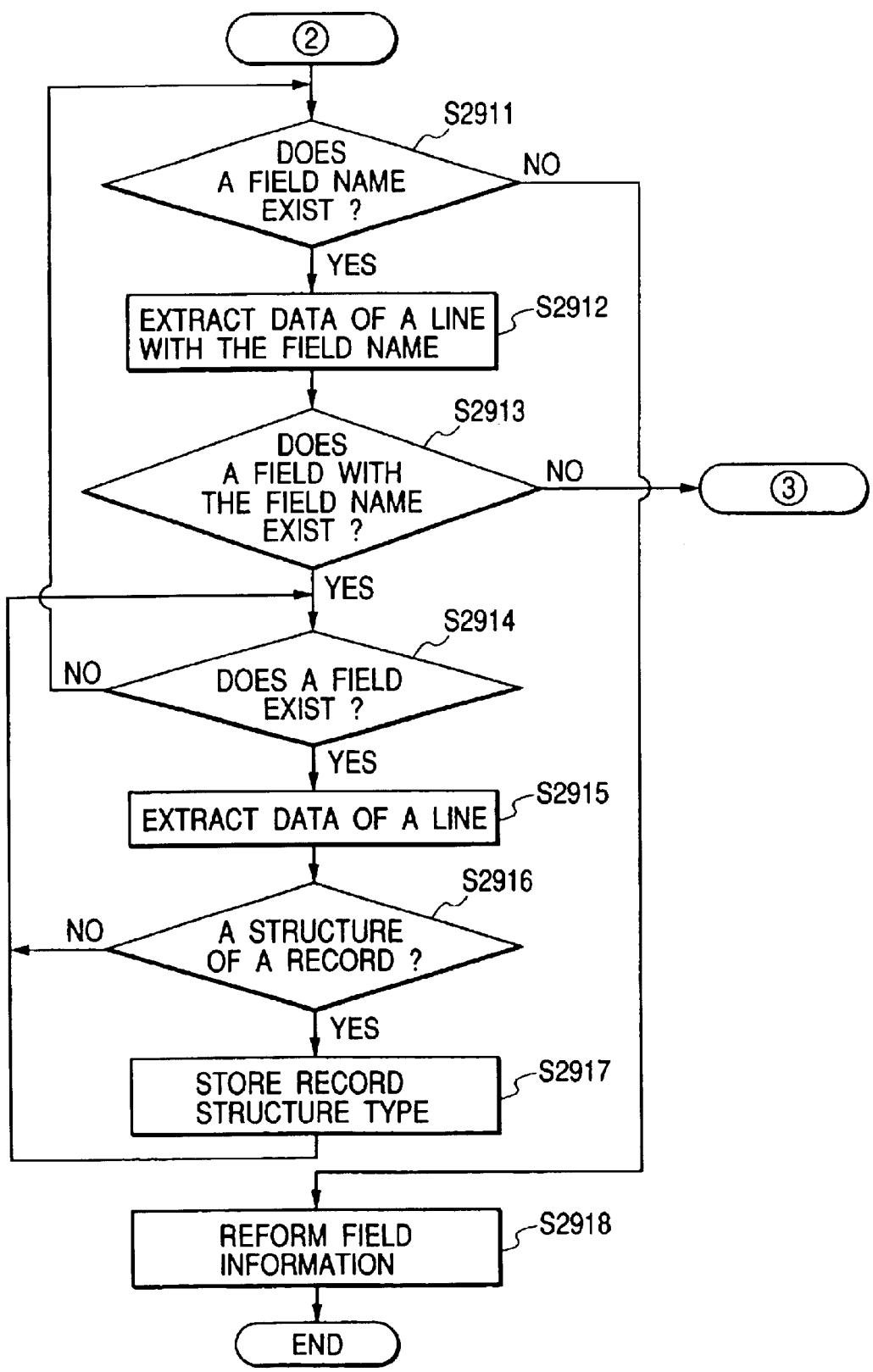
Figure 29D:
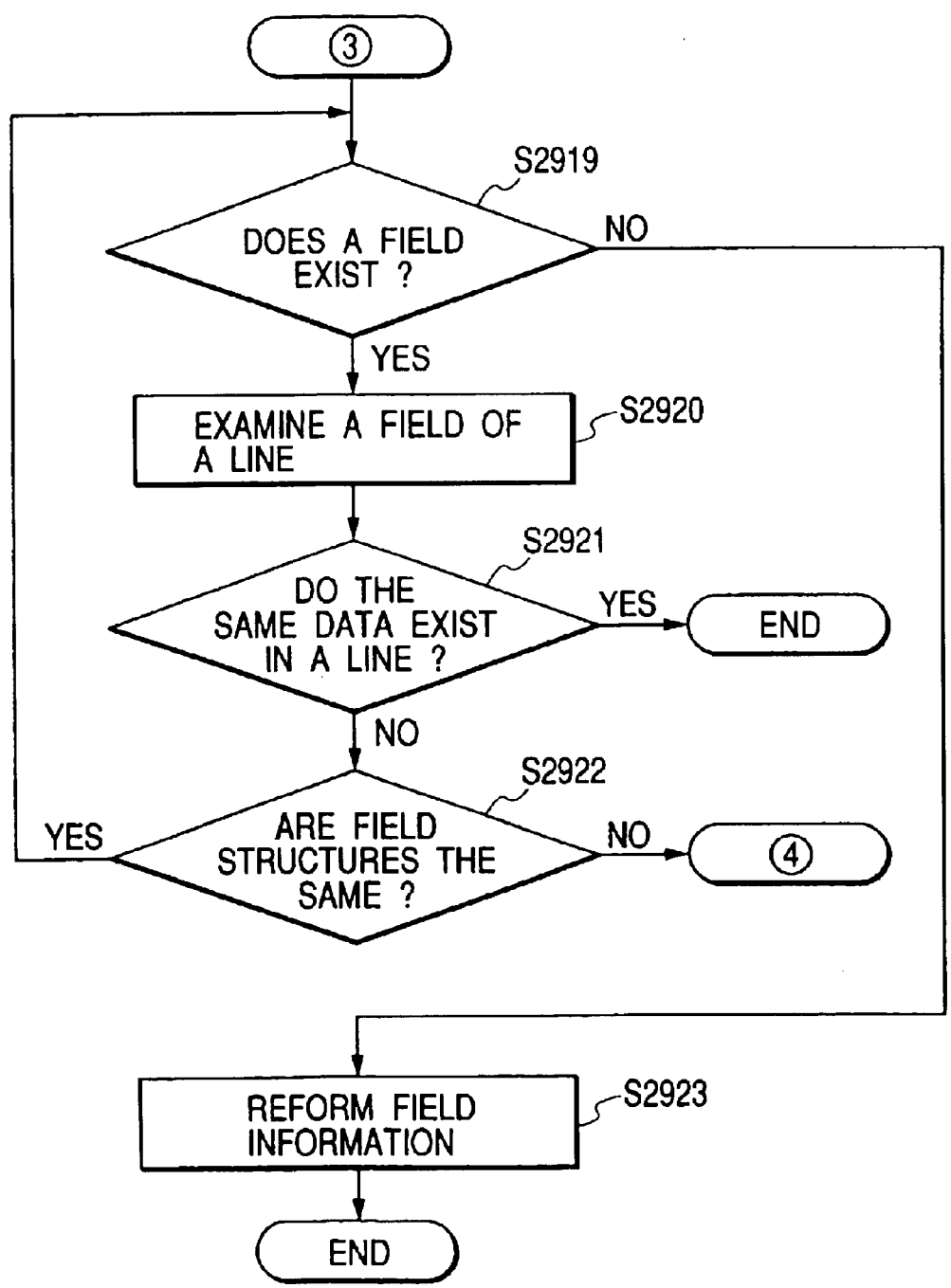
Figure 29E:
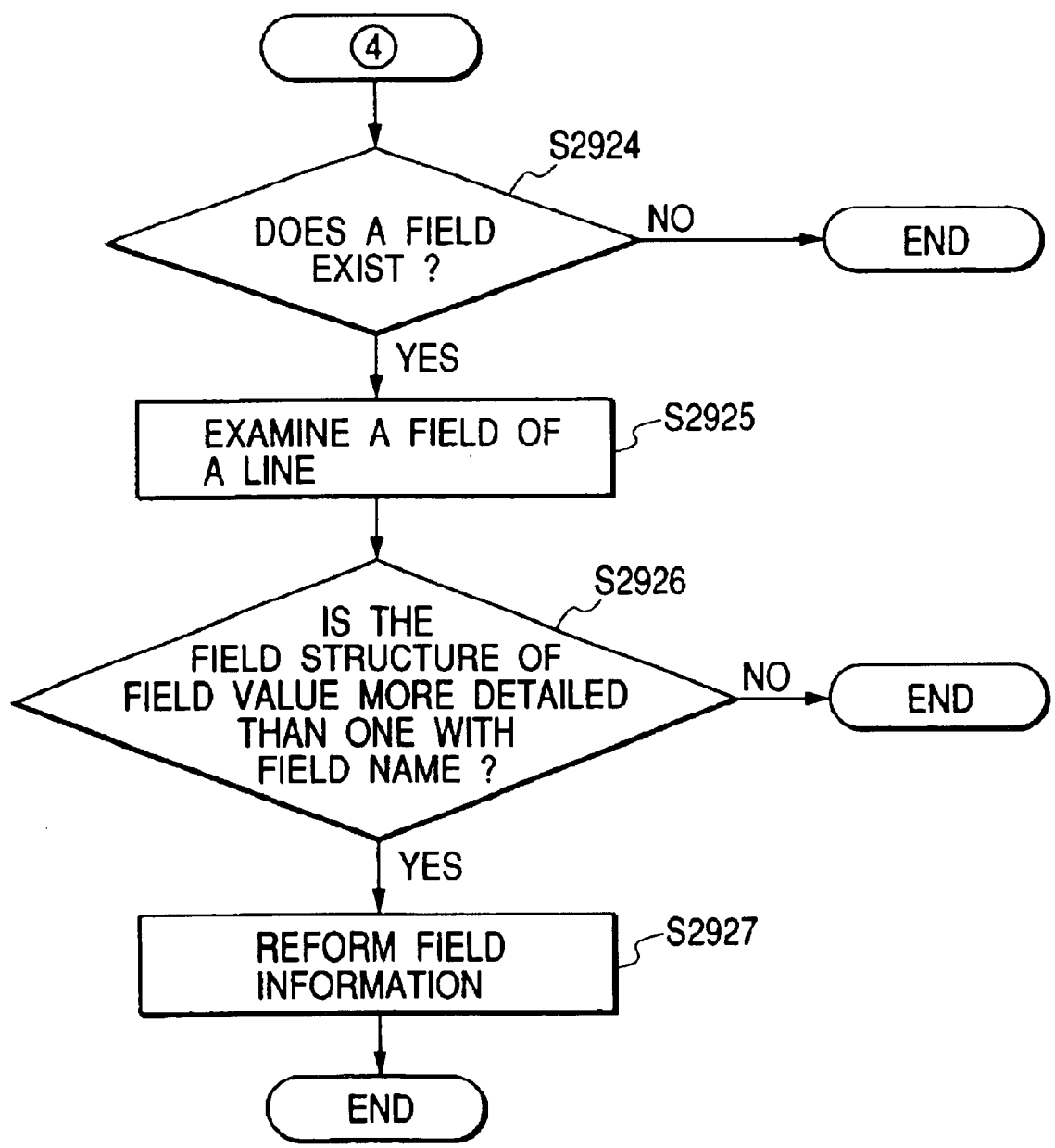

When the multi-row/multi-column table is stored every similar tables, (1) by corresponding the structure of the field of the line with the field name to the structure of the field of the record portion, the record can be picked up, (2) the record can be picked up by matching the structure of the field of the field name describing line with the structure of the field of the record, and (3) the record can be picked up by re-reading the field portion including the multi-row/multi-column. A flow of the process regarding (1) is shown in FIGS. 29A to 29C, a flow of the process regarding (2) is shown in FIG. 29D and a flow of the process regarding (3) is shown in FIG. 29E.

Figure 30A:
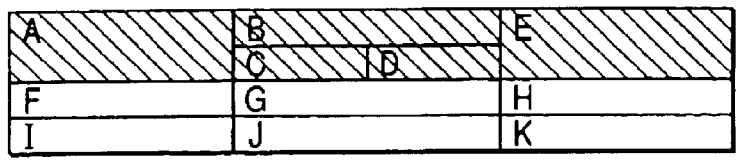
FIGS. 30A, 30B, 30C, 30D, 30E and 30F are views showing example of multi-row/multi-column tables.
Figure 30B:
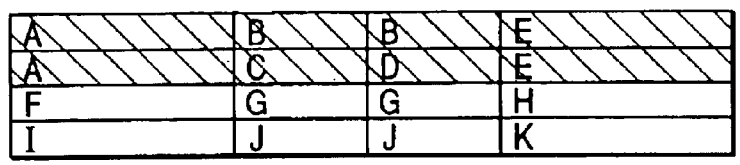

When the data in the table including the multi-row/multi-column is handled, the field of the multi-row or multi-column is divided into minimum unit fields which are in turn stored. In this case, regarding the data of the fields of the multi-row/multi-column, the same data are stored in the respective fields at the stage of division. For example, the multi-row/multi-column shown in FIG. 30A is divided into the minimum unit fields which are in turn stored. Thus, as shown in FIG. 30B, a table having four columns and four rows.

In the above (1), by corresponding the structure of the field of the line with the field name to the structure of the field of the record portion, the record is picked up.

First of all, a process for analyzing the structure of the field of the line with the field name will be explained with reference to FIG. 29A.

In step S2901, if the field exists, the program goes to step S2902. If the field does not exist, the processing of the multi-row/multi-column is ended.

In step S2902, data of a line is extracted, and, in step S2903, a region of lines with the field name is judged, and then the program goes to step S2904. The region of lines with the field name can be judged by examining different columns in fields in one line presently stored and in the fields in the immediately previous line.

Figure 30C:
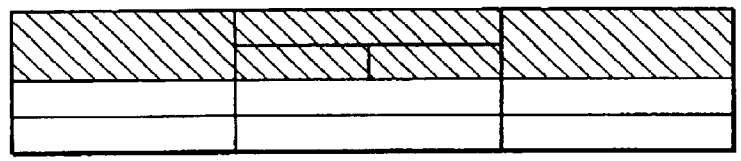
Figure 30D:
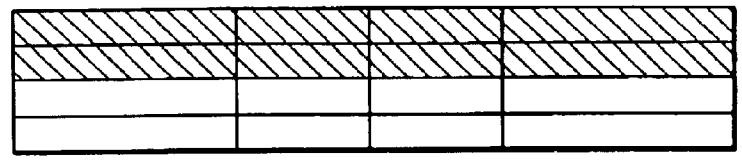

For example, in the multi-row/multi-column as shown in FIG. 30C, since the data is stored by dividing into the minimum unit fields, as shown in FIG. 30D, the table having four columns and four rows is obtained. Here, when the same data between the fields in the first and second lines is examined, since the fields coincide in the first and fourth columns, the border between the first and second lines is not the border for the line with the field name. However, when the same data between the fields in the second and third lines is examined, since any fields do not coincide, the border between the second and third lines becomes border for the line with the field name. In this way, the structure of the lines with the field name can be grasped.

In step S2904, if the structure of the lines with the field name can be grasped, the program goes to ①. If not grasped, in step S2905, data of one line is stored, and, in step S2906, it is examined which structures are given in the fields with the field name till the lines which has been examined up to now, and the program is returned to step S2901.

Figure 30E:
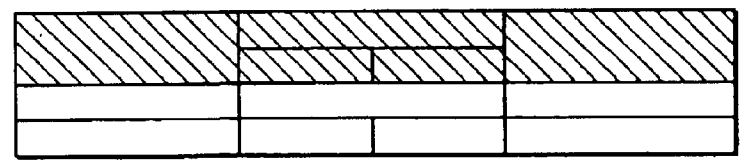

Next, the processing for picking up the records on the basis of the analyzed structures of the fields with the field name will be explained with reference to FIG. 29B. Here, the records in the table in which the structure of the field of the lines with the field name are the same as the structure of the fields of the records, as shown in FIG. 30E, can be picked up. Further, the field is started from the field in the first record.

In step S2907, if the field exists, the program goes to step S2908. If the field does not exist, the program goes to step S2910. However, if no field exists at all, the processing of the multi-row/multi-column is ended.

In step S2908, the data of one line is extracted, and, in step S2909, if the structure of the field of the line with the field name coincides with the structure of one record, the program is returned to step S2907. If it does not coincide, the program goes to ②.

In step S2910, on the basis of the structure of the field of the line with the field name, the field information is reformed.

Figure 30F:
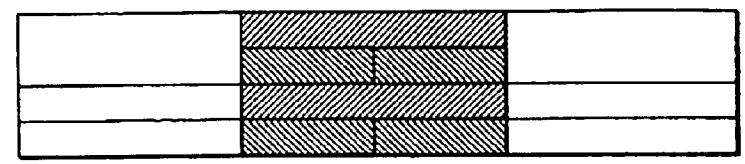

Next, the processing for picking up the record on the basis of the analyzed structure of the field of the line with the field name will be further explained with reference to FIG. 29C. Here, by the structure of the field having the field value as shown in FIG. 30F, the record can be picked up from the table in which the corresponding field name described lines are different. In this table, the field name describing lines are constituted by a plurality of lines. Thus, regarding the fields in the lines with the field name, by scanning the record coinciding with the structure of the field up to the last line of the table to examine correspondence, the records in the table can be picked up.

In step S2911, if the field name of the field name describing line exists, the program goes to step S2912. If it does not exist, the program goes to step S2918. However, if no field name exists at all, the processing of the multi-row/multi-column is ended.

In step S2912, the data of one line with the field name is extracted, and, in step S2913, if the extracted data of one line does not reach the last line of the lines with the field name, the program goes to step S2914. If reached and if data of one line cannot be extracted, the program goes to ③.

In step S2914, if there is a field other than the field of the line with the field name, the program goes to step S2915. If it does not exist, the program is returned to step S2911. However, if no field exists at all, the processing of the multi-row/multi-column is ended.

In step S2915 the data of one line is extracted, and, in step S2916, if the structure of the field of one line with the field name coincides with the structure of the field of one line extracted in step S2915, the program goes to step S2917. If it does not coincide, the program is returned to step S2914.

In step S2917, the structure information of the field name describing line to which the line presently scanned coincides is stored, and the program is returned to step S2914.

In step S2918, on the basis of the structure information stored in step S2917, the field information is reformed.

In the above (2), in the table, since all of the field structures of all of the records coincide, the record can be picked up by matching the structure of the line with the field name with the field structure of the record. Further, the field is started from the field of the first record.

In step S2929 shown in FIG. 29D, if the field exists, the program goes to step S2920. If the field does not exist, the program goes to step S2923. However, if no field exists at all, the processing of the multi-row/multi-column is ended.

In step S2920, the structure of the field of one line is examined, and, in step S2912, if the data of one line are all the same, since the table is a composite table, the processing of the multi-row/multi-column is ended.

Since it is necessary that the field structure of all of the records be coincided, in step S2922, if the field structure of the field of one line examined up to now coincides with the structure of the field of one line examined in step S2920, the program is returned to step S2919. If it does not coincide, the program goes to step ④.

In step S2929, on the basis of the field structure of the record, the field information is reformed by matching the structure of the line with the field name with the field structure of the record.

In the above (3), since the table is a table in which the field portions of the field values are formed as the multi-row/multi-column, by re-reading the field portions having the multi-row/multi-column, the record can be picked up. Further, the field is started from the field of the first record.

In step S2924 shown in FIG. 29E, if the field exists, the program goes to step S2925. If the field does not exist, the processing of the multi-row/multi-column is ended.

In step S2925, the structure of the field of one line is examined, and the program goes to step S2926.

The fact that the field portion of the field value is more detailed means that this field includes the multi-row (or multi-column). Thus, in step S2926, as a result that the structure of the field of one line is examined, if the structure is more detailed than the field name, the program goes to step S2927. Otherwise, the processing of the multi-row/multi-column is ended.

In step S2927, on the basis of the structure of the field of one line examined in step S2925, the field information is reformed by matching the structure of the line with the field name with the field structure of the record.

As mentioned above, regarding the table to be processed, by analyzing the structure of the table and regularity of information description constituting the table and by reforming the table regularly in M columns and N rows, the table can be divided correctly.

[Thirteenth Embodiment]

In a thirteenth embodiment of the present invention, the HTML table reformation part 2501 effects treatment of the composite table. Here, on the basis of the table data stored in the HTML table storage part 101, by analyzing regularity of information description, the table is reformed regularly without omission of M columns and N rows.

The "composite table" is a table in which a plurality of tables are included in a single table and/or the record straddles between plural lines, so that the table analysis cannot be effected easily or simply.

The composite tables can be sorted into (1) a table in which the line with the field name is re-described in the table, (2) a table in which the same field names are included in series, (3) a table in which a field name (different from the common field name) and its field value are described on the way of the table, (4) a table in which a combination of adjacent tables is included in the table, and (5) others. Here, analyzing methods regarding the above (1) to (4) will be described.

Now, the details of the reformation of the HTML table in step S2600 will be explained with reference to FIGS. 31A to 31D.

Figure 31A:
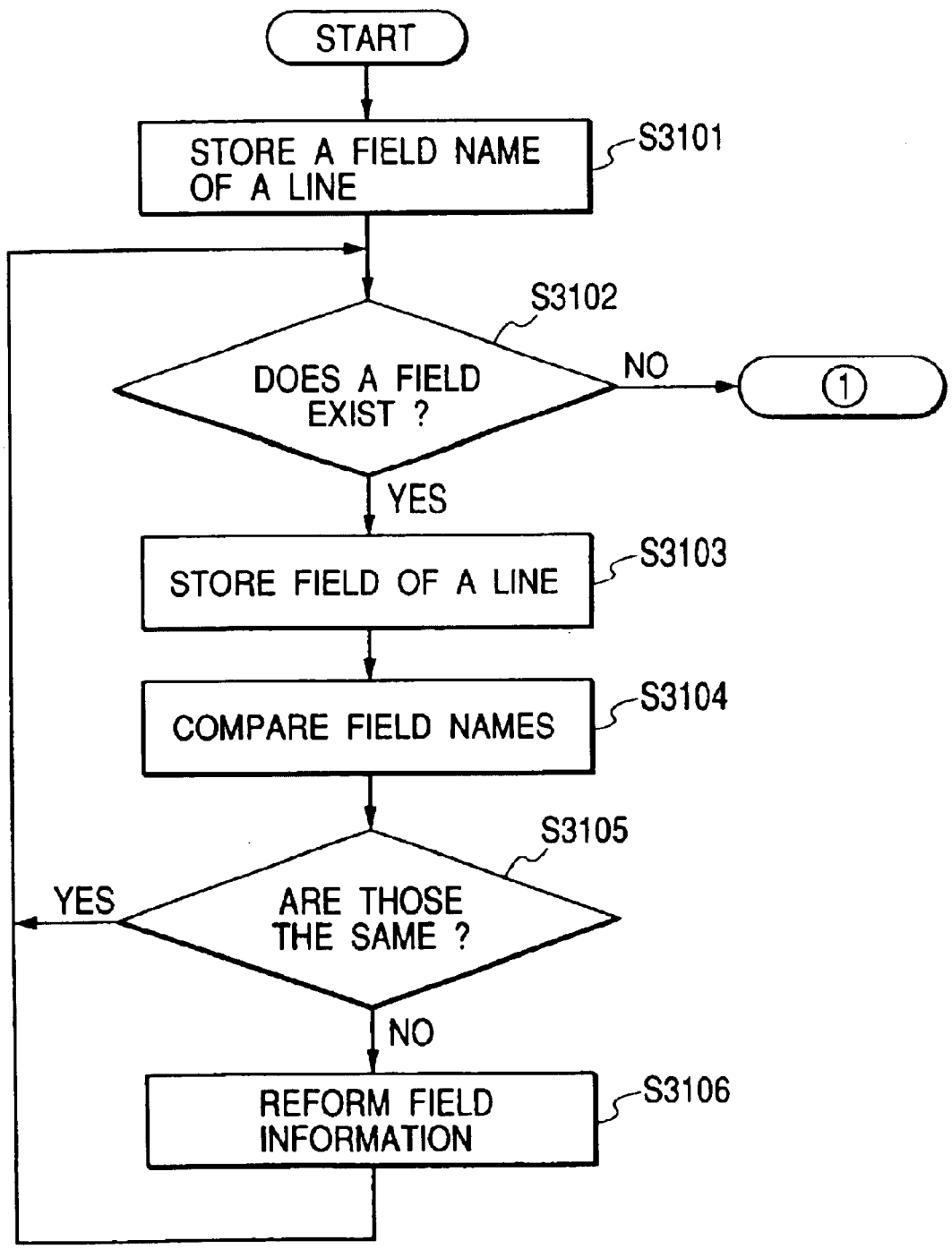
FIGS. 31A, 31B, 31C and 31D are flow charts showing a procedure for HTML table reformation according to a thirteenth embodiment of the present invention.

FIG. 31A is a flow chart for processing the composite table in which the line with the field name is re-described in the table. Here, if the field name of each line with the field name is included in the record, such data is removed.

In step S3101, a field name of one line is stored, and, instep S3102, if the field exists, the program goes to step S3103. If it does not exist, the program goes to ①.

In step S3103, the field of one line is stored, and, in step S3104, the fields of one line in step S3101 is compared with that in step S3103, and the program goes to step S3105.

In step S3105, as a result of comparison in step S3104, if the fields are the same, the program goes to step S3105, and, if not the same, in step S3106, the field information is reformed.

Figure 31B:
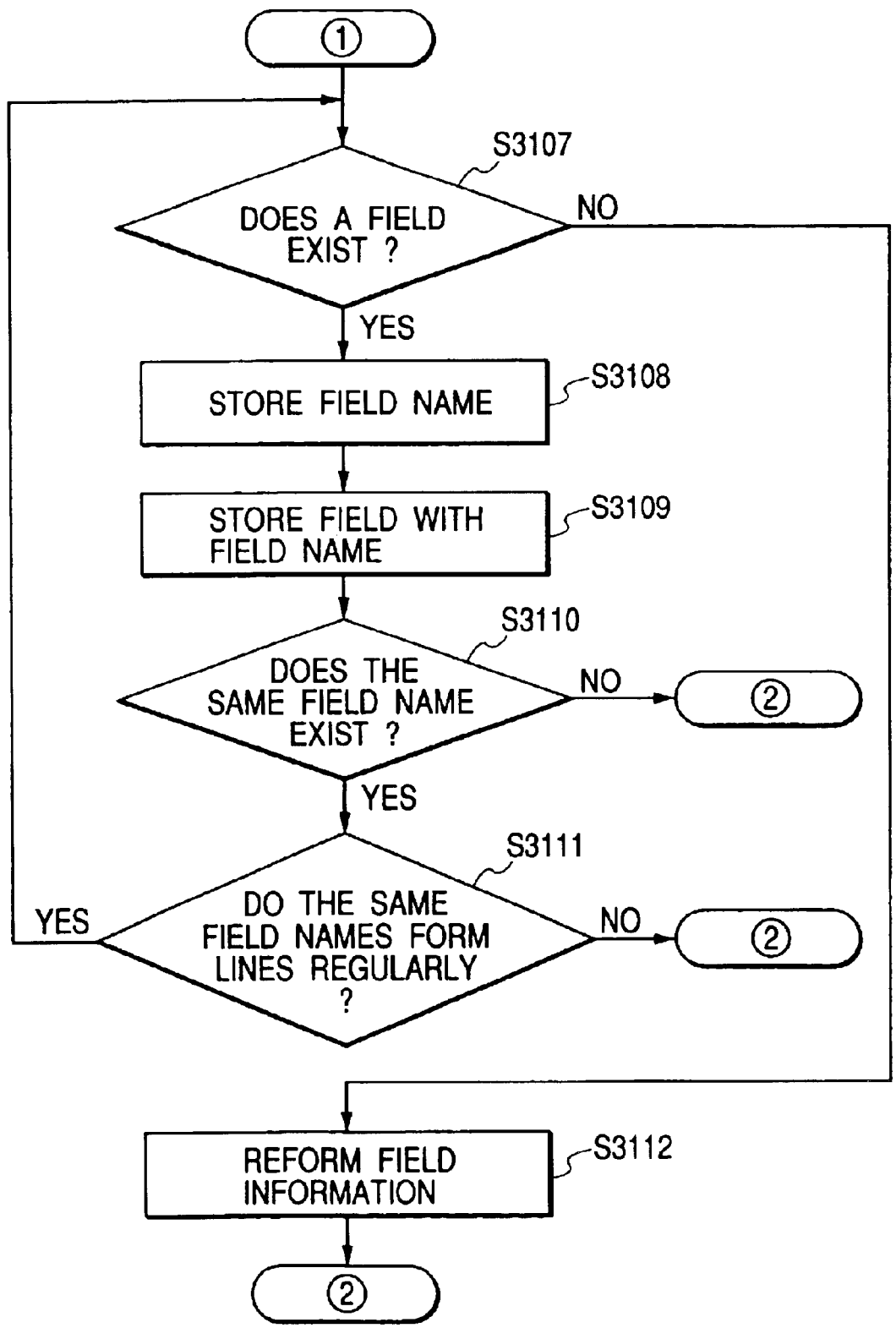

FIG. 31B is a flow chart for processing the composite table in which the same field names are included in series. Here, when the field name of the line with the field name is described by plural times, arrangement of data is modified.

In step S3107, if the field exists, the program goes to step S3108. If the field does not exist, the program goes to step S3112. However, if no field exists at all, the processing of the composite table is ended.

In step S3108, one field name is stored, and the program goes to step S3109. This field name is used for examining whether the same field name is described in the field name describing lines or not.

In step S3109, all of the fields of the lines with the field name are stored, and, in step S3110, if the same field name exists in the lines with the field name, the program goes to step S3111; whereas, if it does not exist, the program goes to ②.

In step S3111, if the field names from lines regularly, the program is returned to step S3107; whereas, if not, the program goes to ②.

In step S3112, the reformation of the field information and reformation of positional relation graph are effected. For example, in FIG. 32A, the field names "ooo", "xxx" "ΔΔΔ" form lines two times. Thus, by storing data of first series (portion shown by gray color) and then storing data of second series (portion shown by white color), the reformation is effected.

Figure 31C:
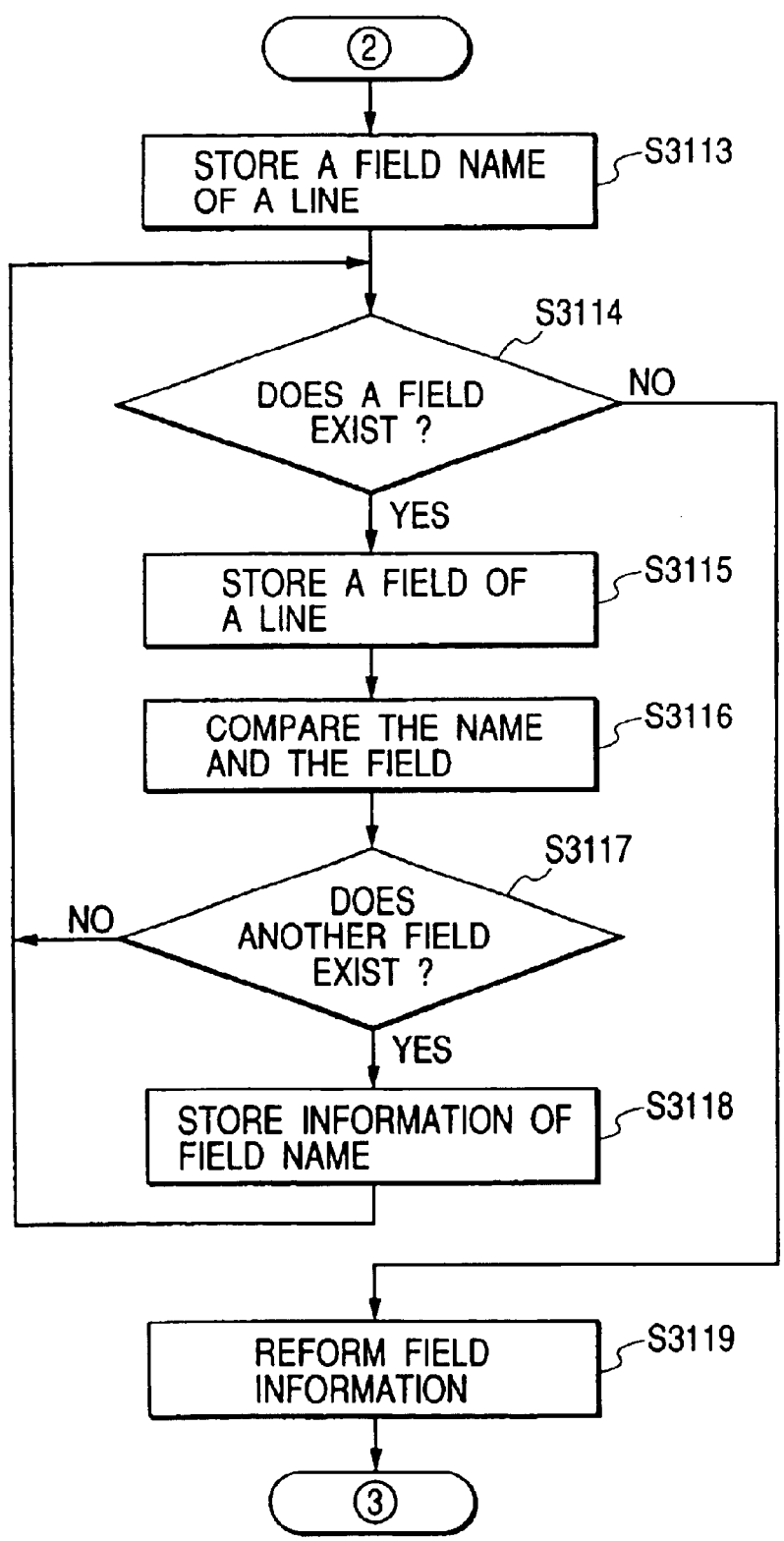

FIG. 31C Shows a flow for processing a composite table in which field names different from the common field names and their field values exist on the way of the table. Here, when the field name describing lines in which the field means are changed partially are re-described and data for new lines with the field name are described in further fields, processing for correcting the order of data.

In step S3113, a field name of a line is stored, and, in step S3114, if the field exists, the program goes to step S3115. If the field does not exist, the program goes to step S3119. However, if no field exists at all, the processing of the composite table is ended.

In step S3115, a field of a line is stored, and, in step S3116, the fields of one line in steps S3113 and S3115 are compared, and the program goes to step S3117.

In step S3117, as a result of comparison in step S3116, if another field exists, the program goes to step S3118; whereas, if another field does not exist, the program is returned to step S3114.

In step S3119, reformation of the field information and reformation of the positional relationship graph are effected.

Figures 32A, 32B, 32C:
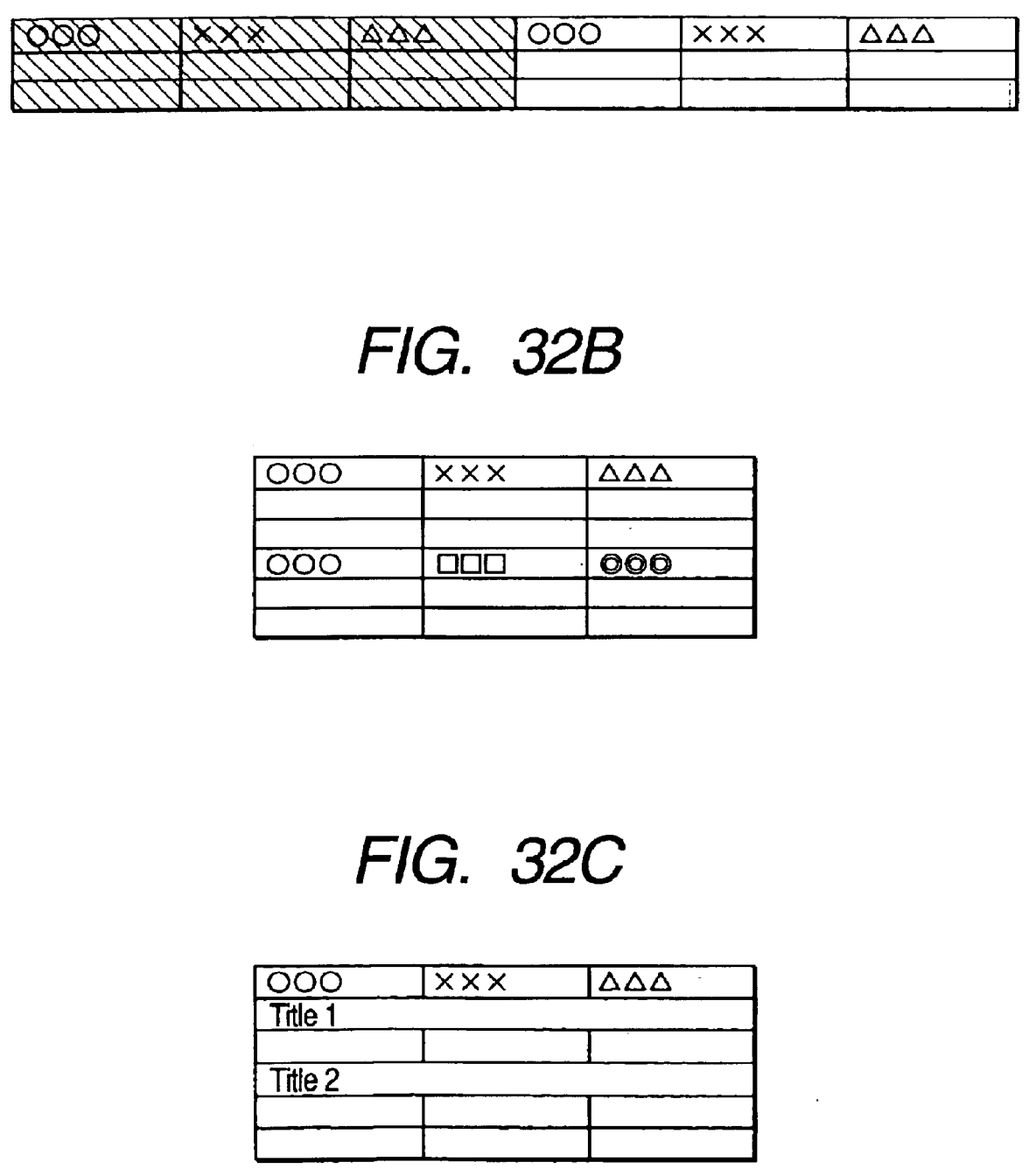

For example, in FIG. 32B, there are field names "OOO", "XXX", "ΔΔΔ" and "OOO", "□□□", "☺☺☺". Thus, the field names are made to "OOO", "xxx", "ΔΔΔ", "□□□", ☺☺☺", and such data are stored and the reformation is performed.

Figure 31D:
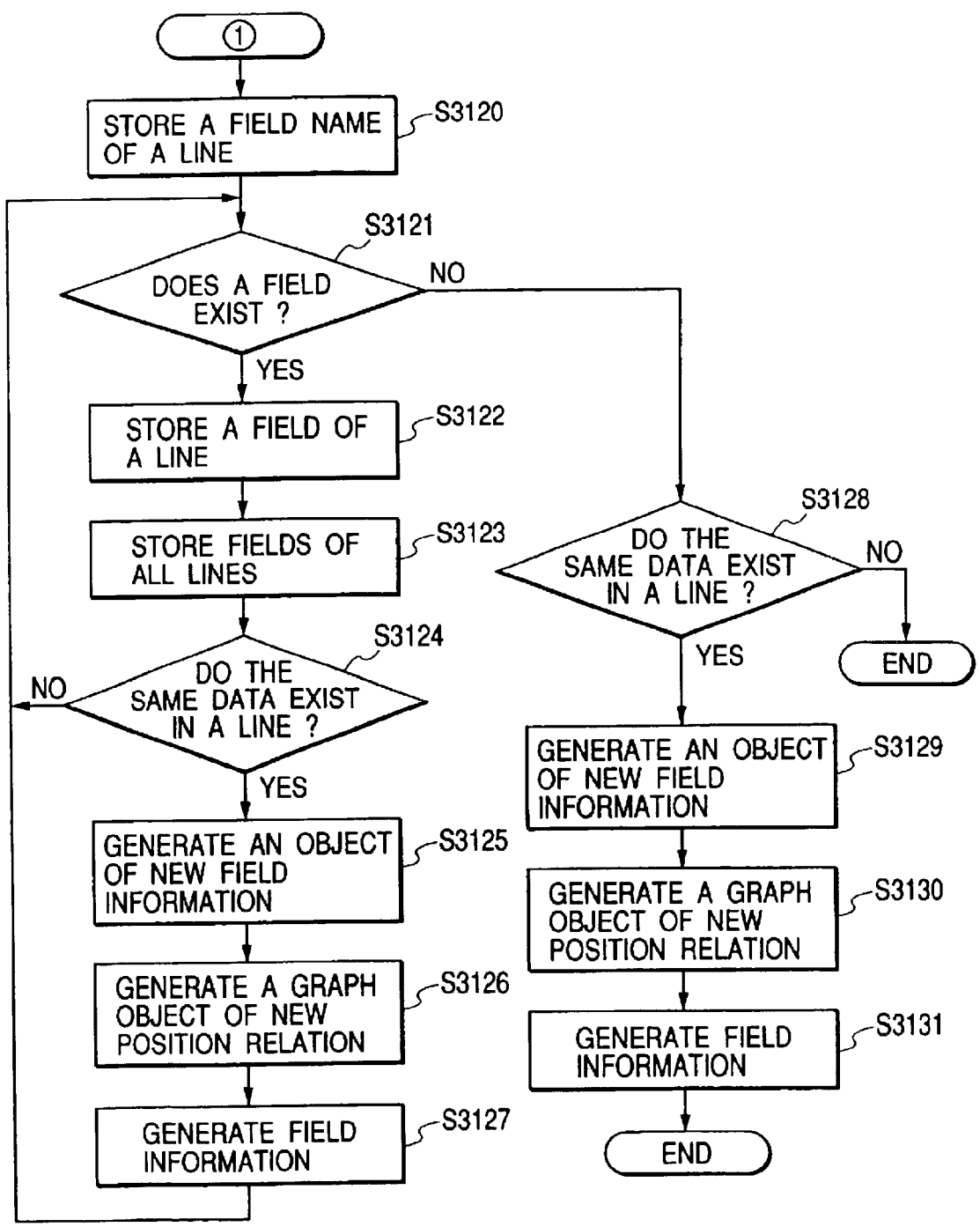

FIG. 31D Shows a flow of processing for a composite table in which there are a plurality of tables (lists) in the table. Here, when the field names are common and a plurality of tables are described in the single table, processing for dividing the tables or lists individually.

In step S3120, a field name of a line is stored, and, in step S3121, if the field exists, the program goes to step S3122. If the field does not exist, the program goes to step S3128. However, if no field exists at all, the processing of the composite table is ended.

In step S3122, a field of a line is stored, and, in step S3123, all of the fields stored in step S3122 up to now are stored, and the program goes to step S3124.

In step S3124, if the same data exist in a line, since such data is a title, the program goes to step S3125 to form a new table. If it does not exist, the program is returned to step S3121. However, at a first time, the program does not go to step S3125 but is returned to step S3121.

In steps S3125 and S3126, objects of new field information object and new positional relationship are generated, and the program goes to step S3127, where reformation of the field information is performed.

For example, in FIG. 32C, regarding the common field name, title 1 is described in a second line and title 2 is described in a fourth line. First of all, if there is the title 1 at the first time, since there is no data, a new table is not generated; if there is the title 2 at the second time, since the data regarding the title 1 has already been stored, a new table regarding the title 1 is generated. Lastly, if there is no field, since the data regarding the title 2 has already been stored, a new table regarding the title 2 is generated.

In step S3128 and further steps, since the processing of the last title is not completed, post-treatment is performed.

First of all, in step S3128, if the same data exist in a line, the program goes to step S3129 to form a new table. If it does not exist, the processing of the composite table is ended.

In steps S3129 and S3130, objects of new field information object and new positional relationship are generated, and the program goes to step S3131, where reformation of the field information is performed, and then the processing of the composite table is ended.

As mentioned above, regarding the table to be processed, by analyzing the structure of the table and regularity of information description constituting the table and by reforming the table regularly without omission of M columns and N rows, the table can be judged.

[Fourteenth Embodiment]

Figure 33:
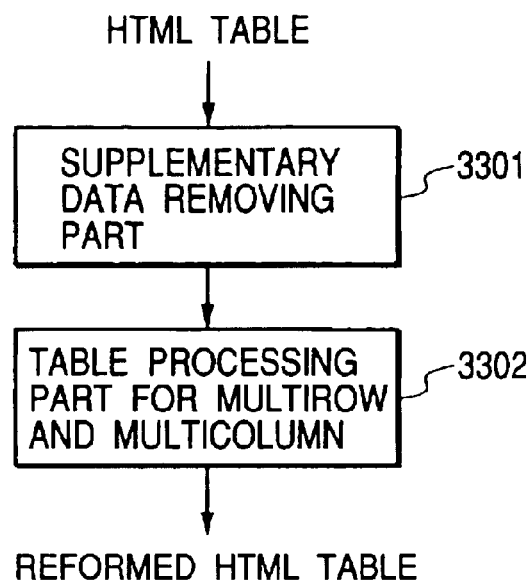
FIG. 33 is a block diagram showing a construction of an HTML table reformation part according to a fourteenth embodiment of the present invention.

In a fourteenth embodiment of the present invention, the HTML table reformation part 2501 is constituted by a supplementary data removal part 3301 and a multi-column/multi-row processing part 3302, as shown in FIG. 33.

Figure 34:
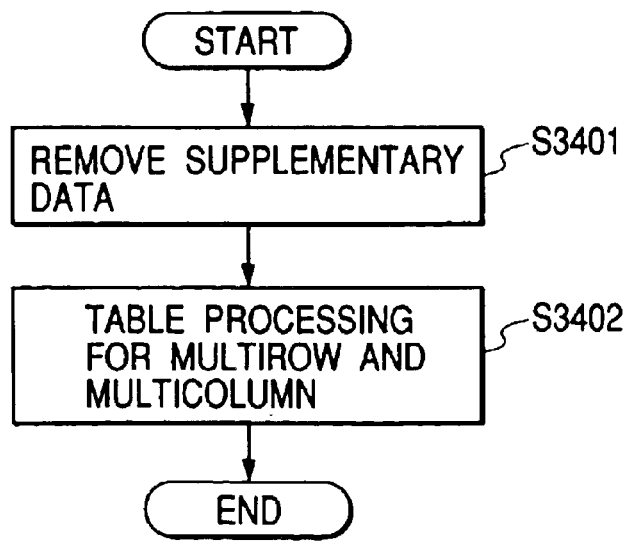
FIG. 34 is a flow chart showing a procedure of the HTML table reformation processing according to the fourteenth embodiment.

Now, the details of the reformation of the HTML table in step S2600 will be explained with reference to FIG. 34.

In step S3401, supplementary data is removed from the HTML table, and, in step S3402, by analyzing the structure of the table with reference to the table data from which the supplementary data is removed, the table is reformed regularly without omission of M columns and N rows, and the processing is ended.

As mentioned above, regarding the table to be processed, by analyzing the structure of the table and regularity of information description constituting the table and by reforming the table regularly without omission of M columns and N rows, the table can be judged.

[Fifteenth Embodiment]

Figure 35:
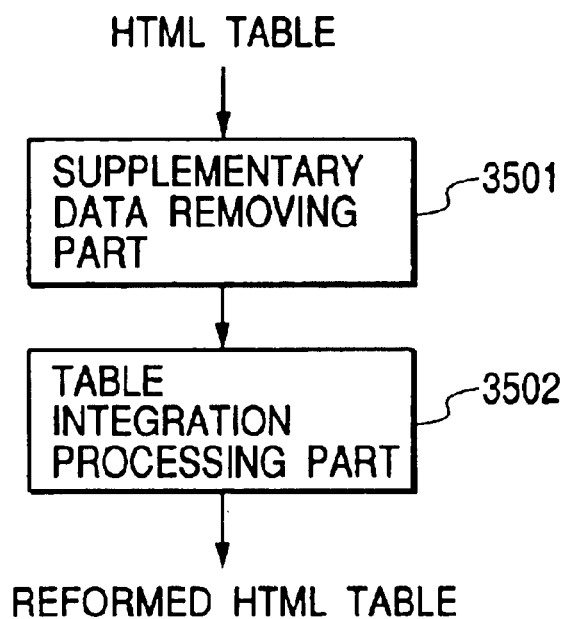
FIG. 35 is a block diagram showing a construction of an HTML table reformation part according to a fifteenth embodiment of the present invention.

In a fifteenth embodiment of the present invention, the HTML table reformation part 2501 is constituted by a supplementary data removal part 3501 and a composite table processing part 3502, as shown in FIG. 35.

Figure 36:
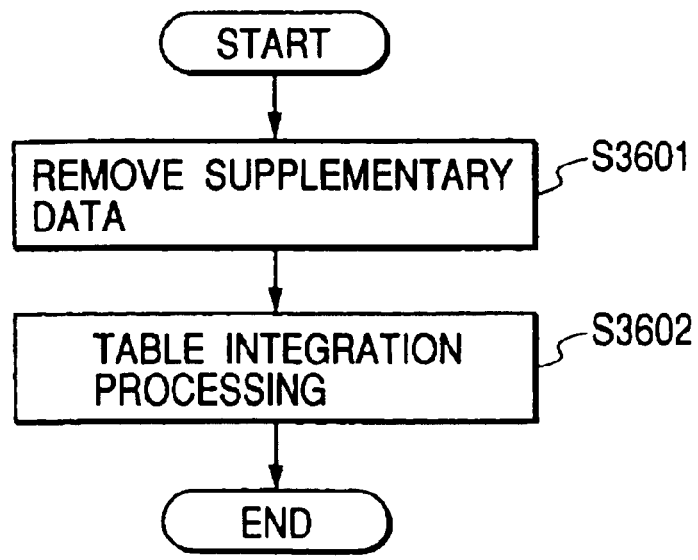
FIG. 36 is a flow chart showing a procedure of the HTML table reformation processing according to the fifteenth embodiment.

Now, the details of the reformation of the HTML table in step S2600 will be explained with reference to FIG. 36.

In step S3601, supplementary data is removed from the HTML table, and, in step S3602, by analyzing the regularity of the information description with reference to the table data from which the supplementary data is removed, the table is reformed regularly without omission of M columns and N rows, and the processing is ended.

As mentioned above, regarding the table to be processed, by analyzing the structure of the table and regularity of information description constituting the table and by reforming the table regularly without omission of M columns and N rows, the table can be judged.

[Sixteenth Embodiment]

Figure 37:
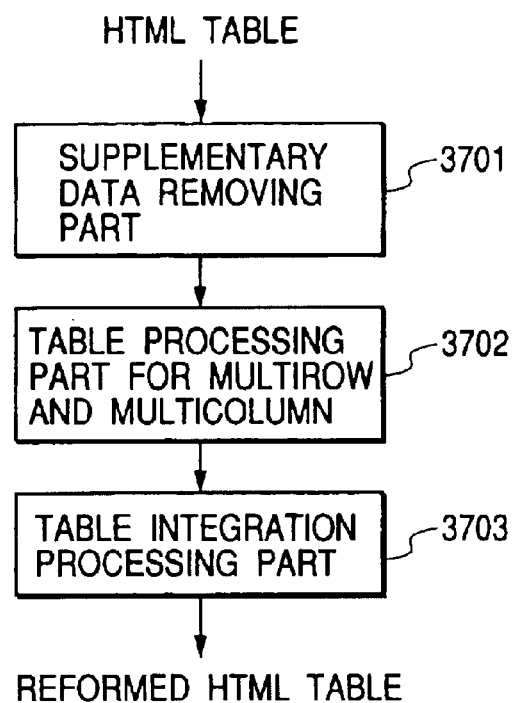
FIG. 37 is a block diagram showing a construction of an HTML table reformation part according to a sixteenth embodiment of the present invention.

In a sixteenth embodiment of the present invention, the HTML table reformation part 2501 is constituted by a supplementary data removal part 3701, a multi-column/multi-row processing part 3702 and a composite table processing part 3703, as shown in FIG. 37.

Figure 38:
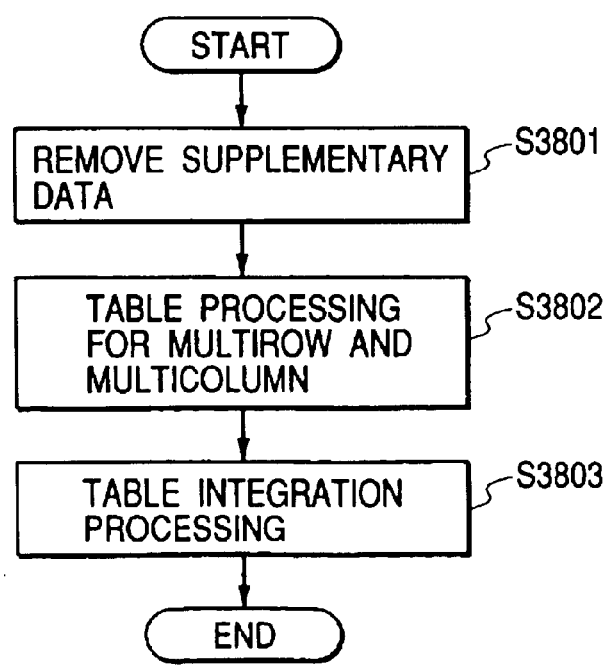
FIG. 38 is a flow chart showing a procedure of the HTML table reformation processing according to the sixteenth embodiment.

Now, the details of the reformation of the HTML table in step S2600 will be explained with reference to FIG. 38. In step S3801, supplementary data is removed from the HTML table, and, in step S3802, by analyzing the structure of the table with reference to the table data from which the supplementary data is removed, the table is reformed regularly without omission of M columns and N rows, and the program goes to step S3803.

In step S3803, by analyzing the regularity of information description with reference to the reformation data of step S3802, the table is reformed regularly without omission of M columns and N rows, and the processing is ended.

As mentioned above, regarding the table to be processed, by analyzing the structure of the table and regularity of information description constituting the table and by reforming the table regularly without omission of M columns and N rows, the table can be judged.

[Seventeenth Embodiment]

Figure 39:
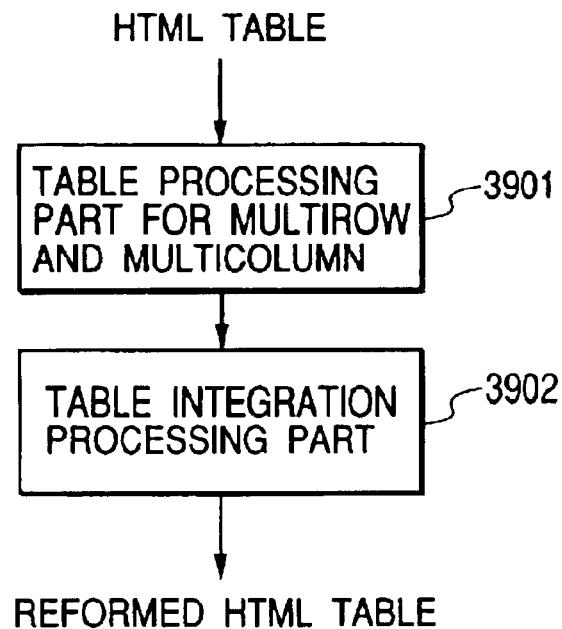
FIG. 39 is a block diagram showing a construction of an HTML table reformation part according to a seventeenth embodiment of the present invention.

In a seventeenth embodiment of the present invention, the HTML table reformation part 2501 is constituted by a multi-column/multi-row processing part 3901 and a composite table processing part 3902, as shown in FIG. 39.

Figure 40:
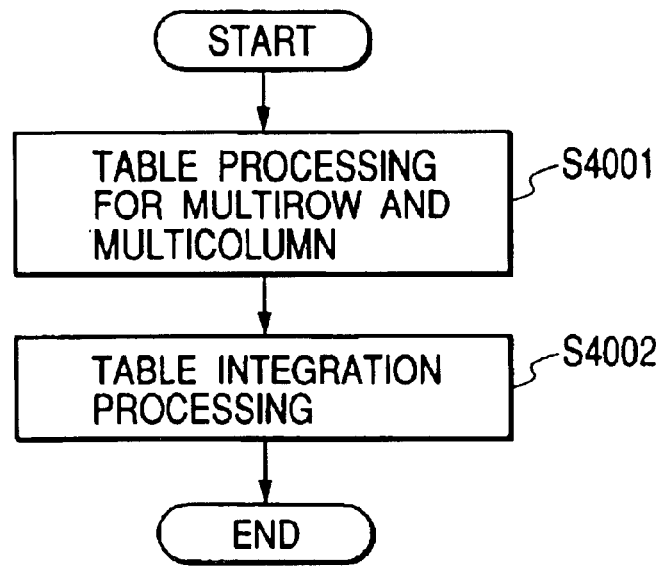
FIG. 40 is a flow chart showing a procedure of the HTML table reformation processing according to the seventeenth embodiment.

Now, the details of the reformation of the HTML table in step S2600 will be explained with reference to FIG. 40.

In step S4001, by analyzing the structure of the table with reference to the table data from which the supplementary data is removed, the table is reformed regularly without omission of M columns and N rows, and the program goes to step S4002.

In step S4002, by analyzing the regularity of information description with reference to the reformation data of step S4001, the table is reformed regularly without omission of M columns and N rows, and the processing is ended.

As mentioned above, regarding the table to be processed, by analyzing the structure of the table and regularity of information description constituting the table and by reforming the table regularly without omission of M columns and N rows, the table type can be judged.

Incidentally, the present invention may be applied to a system including a plurality of units of equipment (for example, a computer body, an interface equipment, a display and the like) or a system including a single piece of equipment, so long as the functions of the above-mentioned embodiments can be realized.

Further, a technique in which, for the purpose for operating various devices to realize functions of the above-mentioned embodiments, software program code for realizing functions of the above-mentioned embodiments is supplied to a computer (or CPU or MPU) in an apparatus or a system connected to various devices so that the various devices are operated by the computer in the apparatus or the system in accordance with the program code, is also included within the scope of the invention. Further, in this case, the program code itself read out from a recording medium realizes the functions of the above-mentioned embodiments, and, thus, the program code itself and means for supplying the program code to the computer (for example, recording medium storing the program code) constitute the present invention.

The recording medium for supplying the program code may be, for example, a floppy disk, a hard disk, an optical disk, a photo-magnetic disk, CD-ROM, CD-R, a magnetic tape, a non-volatile memory card or ROM.

Further, when not only the functions of the above-mentioned embodiments are realized by carrying out the program code read out from the computer but also the functions of the above-mentioned embodiments are realized by cooperation with OS (operating system) operating on the computer or other application software on the basis of instruction of the program code, such program code is included within the scope of the invention.

Further, of course, the present invention includes a technique in which, after the program code read out from the recording medium is written in a memory of a function expansion board inserted into the computer or a function expansion unit connected to the computer, a CPU of the function expansion board or the function expansion unit carries out the actual processing partially or totally on the basis of instruction of the program code, thereby realizing the functions of the above-mentioned embodiments.

When the present invention is applied to the above-mentioned recording medium, program codes corresponding the above-mentioned flow charts may be stored in the recording medium.

Although the present invention has been described in its preferred forms with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A document segmentation apparatus for segmenting a first type of table, for presenting data in a visual tabular format, or a second type of table represented between tags defined in a language for use in composing the layout of web pages containing data that lacks tabular relationships, comprising:

table analyzing means for generating cell vectors representing characteristics of cells having at least one of row width and column width of the cells, and cell position data indicating a positional relationship between cells, by analyzing a table in a document to be processed;

table type judging means for judging, with reference to the cell position data and the cell vectors generated by said table analyzing means, whether the table analyzed by said table analyzing means is either a table of the first type or a table of the second type;

first segment generating means for generating a plurality of segments by dividing the table with a first method in a case in which said table type judging means judges that the table analyzed by said table analyzing means is a table of the first type; and second segment generating means for generating a plurality of segments by dividing the table with a second method in a case in which said table type judging means judges that the table analyzed by said table analyzing means is a table of the second type.

2. A document segmentation apparatus according to claim 1, wherein said first segment generating means comprise:

cut direction determination means for determining a cut direction of the table by judging whether the data is expressed in a column or a row in the table on the basis of the cell position data and the cell vectors; and table segment generating means for generating a table segment by dividing the table on the basis of the table type and the cut direction.

3. A document segmentation apparatus according to claim 2, wherein said second segment generating means generate the table itself as the segment.

4. A document segmentation apparatus according to claim 1, wherein said second segment generating means comprise:

cell cluster generating means for generating cell cluster information by clustering the cells in the table; and layout segment generating means for generating segment by connecting the cells in the table with reference to the cell position data and the cell cluster information.

5. A document segmentation apparatus according to claim 4, wherein said first segment generating means generate the table itself as the segment.

6. A document segmentation apparatus according to claim 4, wherein said second segment generating means generate the table itself as the segment.

7. A document segmentation apparatus according to claim 1, further comprising normal segment generating means for dividing the document into a segment which corresponds to one table, wherein the table generated as one segment by said normal segment generating means is to be processed by said table analyzing means.

8. A document segmentation apparatus according to claim 1, wherein said table analyzing means further generate cell data of the analyzed table and said table and said table type judging means judge the table type with reference to the cell data.

9. A document segmentation apparatus according to claim 8, wherein said table type judging means comprise similarity judging means for judging the table type on the basis of similarity between the cell data positioned at particular positions with reference to the cell position data and the cell data generated by said table analyzing means.

10. A document segmentation apparatus according to claim 8, wherein said table type judging means comprise partial character line extracting means for extracting partial character lines from the cell data positioned at a particular position with reference to the cell position data and the cell data generated by said table analyzing means, and character line comparing means for comparing the extracted partial character lines to judge the table type.

11. A document segmentation apparatus according to claim 8, wherein said table type judging means comprise partial character line extracting means for extracting partial character lines from the cell data positioned at a particular position with reference to the cell position data and the cell data generated by said table analyzing means, and similarity judging means for judging the table type on the basis of similarity between the partial character lines.

12. A document segmentation apparatus according to claim 8, wherein said table type judging means comprise syntax judging means for judging the table type with reference to the cell position data, the cell vectors and the cell data generated by said table analyzing means, and similarity judging means for judging the table type on the basis of similarity between the cell data positioned at particular positions with reference to the cell position data and the cell data generated by said table analyzing means.

13. A document segmentation apparatus according to claim 8, wherein said table type judging means comprise syntax judging means for judging the table type with reference to the cell position data, the cell vectors and the cell data generated by said table analyzing means, partial character line extracting means for extracting partial charter lines from the cell data positioned at a particular position with reference to the cell position data and the cell data generated by said table analyzing means, and, character line comparing means for comparing the extracted partial character lines to judge the table type.

14. A document segmentation apparatus according to claim 8, wherein said table type judging means comprise syntax judging means for judging the table type with reference to the cell position data, the cell vectors and the cell data generated by said table analyzing means, partial character line extracting means for extracting partial character lines from the cell data positioned at a particular position with reference to the cell position data and the cell data generated by said table analyzing means, and similarity judging means for judging the table type on the basis of similarity between the extracted partial character lines.

15. A document segmentation apparatus according to claim 1, further comprising table reforming means for reforming the table so that the number of cells in each column and each row becomes the same, by analyzing the table to be processed, wherein said table analyzing means analyze the reformed table.

16. A document segmentation apparatus according to claim 15, wherein said table reforming means comprise supplementary data removing means for removing data added to the table from the table data.

17. A document segmentation apparatus according to claim 15, wherein said table reforming means comprise multi-row/multi-column processing means for reforming the table regularly by analyzing the structure of the table data.

18. A document segmentation apparatus according to claim 15, wherein said table reforming means comprise composite table processing means for reforming the table by analyzing regularity of information description constituting the table.

19. A document segmentation apparatus according to claim 15, wherein said table reforming mea comprise:

supplementary data removing means for removing data added to the table from the table data; and multi-row/multi-column processing means for reforming the table regularly by analyzing the structure of the table data.

20. A document segmentation apparatus according to claim 15, wherein said table reforming means comprise;

supplementary data removing means for moving data added to the table from the table data; and composite table processing means for reforming the table by analyzing regularity of information description constituting the table.

21. A document segmentation apparatus according to claim 15, wherein said table reforming means comprise:

multi-row/multi-column processing means for reforming the table regularly by analyzing the structure of the table data; and composite table processing means for reforming the table by analyzing regularity of information description constituting the table.

22. A document segmentation apparatus according to claim 15, wherein said table reforming means comprise:

supplementary data removing moans for removing data added to the table from the table data;

multi-row/multi-column processing means for reforming the table regularly by analyzing the structure of the table data; and composite table processing means for reforming the table by analyzing regularity of information description constituting the table.

23. A document segmentation method for segmenting a first type of table, for presenting data in a visual tabular format, or a second type of table represented between tags defined in a language for use in composing the layout of web pages containing data that lacks tabular relationships, comprising:

table analyzing step for generating cell vectors representing characteristics of cells having at least one of row width and column width of the cells, and cell position data indicating a positional relationship between cells, by analyzing a table in a document to be processed;

table type judging step for judging, with reference to the cell position data and the cell vectors generated by said table analyzing step, whether the table analyzed by said table analyzing step is either a table of the first type or a table of the second type;

first segment generating step for generating a plurality of segments by dividing the table with a first method in a case in which said table type judging step judges that the table analyzed by said table analyzing step is a table of the first type; and second segment generating step for generating a plurality of segments by dividing the table with a second method in a case in which said table type judging step judges that the table analyzed by said table analyzing step is a table of the second type.

24. A document segmentation method according to claim 23, wherein said first segment generating step comprises:

a cut direction determination step, of determining a cut direction of the table by judging whether the data is expressed in a column or a row in the table on the basis of the cell position data and the cell vectors; and a table segment generating step, of generating a table segment by dividing the table on the basis of the table type and the cut direction.

25. A document segmentation method according to claim 24, wherein said second segment generating step includes generating the table itself as the segment.

26. A document segmentation method according to claim 23, wherein said second segment generating step comprises:

a cell cluster generating step, of generating cell cluster information by clustering the cells in the table; and a layout segment generating step, of generating segment by connecting the cells in the table with reference to the cell position data and the cell cluster information.

27. A document segmentation method according to claim 26, wherein said first segment generating step includes generating the table itself as the segment.

28. A document segmentation method according to claim 26, wherein said second segment generating step includes generating the table itself as the segment.

29. A document segmentation method according to claim 23, further comprising a normal segment generating step, of dividing the document into a segment which corresponds to one table, wherein the table generated as one segment in said normal segment generating step is to be processed in said table analyzing step.

30. A document segmentation method according to claim 23, wherein said table analyzing step further includes generating cell data of the analyzed table and said table type judging step includes judging the table type with reference to the cell data.

31. A document segmentation method according to claim 30, wherein said table type judging step comprises a similarity judging step, of judging the table type on the basis of similarity between the cell data positioned at particular positions with reference to the cell position data and the cell data generated in said table analyzing step.

32. A document segmentation method according to claim 30, wherein said table type judging step comprises a partial character line extracting step, of extracting partial character lines from the cell data positioned at a particular position with reference to the cell position data and the cell data generated in said table analyzing step, and a character line comparing step, of comparing the extracted partial character lines to judge the table type.

33. A document segmentation method according to claim 30, wherein said table type judging step comprises a partial character line extracting step, of extracting partial chart lines from the cell data positioned at a particular position with reference to the cell position data and the cell data generated in said table analyzing step, and a similarity judging step, of judging the table type on the basis of similarity between the extracted partial character lines.

34. A document segmentation method according to claim 30, wherein said table type judging step comprises a syntax judging step, of judging the table type with reference to the cell position data, the cell vectors and the cell data generated in said table analyzing step, and a similarity judging step, of judging the table type on the basis of similarity between the cell data positioned at particular positions with reference to the cell position data and the cell data generated in said table analyzing step.

35. A document segmentation method according to claim 30, wherein said table type judging step comprises a syntax judging step, of judging the table type with reference to the cell position data, the cell vectors and the cell data generated in said table analyzing step, a partial character line extracting step, of extracting partial character lines from the cell data positioned at a particular position with reference to the cell position data and the cell data generated in said table analyzing step, and a character line comparing step, of comparing the extracted partial character lines to judge the table type.

36. A document segmentation method according to claim 30, wherein said table type judging step comprises a syntax judging step, of judging the table type with reference to the cell position data, the cell vectors and the cell data generated in said table analyzing step, a partial character line exacting step, of extracting partial character lines from the cell data positioned at a particular position with reference to the cell position data and the cell data generated in said table analyzing step, and a similarity judging step, of judging the table type on the basis of similarity between the extracted partial character lines.

37. A document segmentation method according to claim 23, further comprising a table reforming step, of reforming the table so that the number of cells in each column and each row becomes the same, by analyzing the table to be processed, wherein said table analyzing step includes analyzing the reformed table.

38. A document segmentation method according to claim 37, wherein said table reforming step comprises a supplementary data removing step, of removing data added to the table from the table data.

39. A document segmentation method according to claim 37, wherein said table reforming step comprises a multi-row/multi-column processing step, of reforming the table regularly by analyzing the structure of the table data.

40. A document segmentation method according to claim 37, wherein said table reforming step comprises a composite table processing step, of reforming the table by analyzing regularity of information description constituting the table.

41. A document segmentation method according to claim 37, wherein said table reforming step comprises:

a supplementary data removing step, of removing data added to the table from the table data; and a multi-row/multi-column processing step, of reforming the table regularly by analyzing the structure of the table data.

42. A document segmentation method according to claim 37, wherein said table reform step comprises:

a supplementary data removing step, of removing data added to the table from the table data; and a composite table processing step, of reforming the table by analyzing regularity of information description constituting the table.

43. A document segmentation method according to claim 37, wherein said table reforming step comprises:

a multi-row/multi-column processing step, of reforming the table regularly by analyzing the structure of the table data; and a composite table processing step, of reforming the table by analyzing regularity of information description constituting the table.

44. A document segmentation method according to claim 37, wherein said table reforming step comprises:

a supplementary data removing step, of removing data added to the table from the table data;

a multi-row/multi-column processing step, of reforming the table regularly by analyzing the structure of the table data; and a composite table processing step, of reforming the table by analyzing regularity of information description constituting the table.

45. A computer-readable storage medium storing a document segmentation program for controlling a computer to perform document segmentation for segmenting a first type of table, for presenting data in a visual tabular format, or a second type of table represented between tags defined in a language for use in composing the layout of web pages containing data that lacks tabular relationships, comprising:

table analyzing step for generating cell vectors representing characteristics of cells having at least one of row width and column width of the cells, and cell position data indicating a positional relationship between cells, by analyzing a table in a document to be processed;

table type judging step for judging, with reference to the cell position data and the cell vectors generated by said table analyzing step, whether the table analyzed by said table analyzing step is either a table of the first type or a table of the second type;

first segment generating step for generating a plurality of segments by dividing the table with a first method in a case in which said table type judging step judges that the table analyzed by said table analyzing step is a table of the first type; and second segment generating step for generating a plurality of segments by dividing the table with a second method in a case in which said table type judging step judges that the table analyzed by said table analyzing step is a table of the second type.

* * * * *

UNITED STATES PATENT AND TRADEMARK OFFICE
CERTIFICATE OF CORRECTION

| | |
|---|---|
| PATENT NO. | : 6,865,720 B1 |
| APPLICATION NO. | : 09/533255 |
| DATED | : March 8, 2005 |
| INVENTOR(S) | : Noriko Otani et al. |

It is certified that error appears in the above-identified patent and that said Letters Patent is hereby corrected as shown below:

Column 5,
Line 34 and 36, "image," should read -- $image_1$ --;
Line 38, "image" should read -- $image_1$ --;
Line 43, ""./image/hoge.gif"" should read -- "../image/hoge.gif" --;
Line 44, "hogehoge.aaa.bbbbb.cojp:" should read -- hogehoge.aaa.bbbbb.co.jp: --;
Line 47, "hogchoge." should read -- hogehoge. --; and
Line 49, "bbbbb.ccjp:" should read -- bbbbb.co.jp: --.

Column 6,
Line 53, "call" should read -- cell --.

Column 7,
Line 53, "$Z_1 \epsilon \epsilon Z$." should read -- $Z, \epsilon Z$. --;
Line 57, "$Y_0$." should read -- $x_0$. --; and
Line 64, "Step S." should read -- Step 5. --.

Column 9,
Line 6, "J" should be deleted.

Column 10,
Line 55, "Show" should read -- show --.

Column 11,
Line 33, "Shows" should read -- shows --.

Column 14,
Line 40, "Instep" should read -- In step --.

UNITED STATES PATENT AND TRADEMARK OFFICE
CERTIFICATE OF CORRECTION

PATENT NO. : 6,865,720 B1
APPLICATION NO. : 09/533255
DATED : March 8, 2005
INVENTOR(S) : Noriko Otani et al.

It is certified that error appears in the above-identified patent and that said Letters Patent is hereby corrected as shown below:

Column 22,
Line 3, "Shows" should read -- shows --.

Signed and Sealed this

Eleventh Day of July, 2006

JON W. DUDAS
*Director of the United States Patent and Trademark Office*